United States Patent [19]

Slafer et al.

[11] Patent Number: 4,752,884

[45] Date of Patent: Jun. 21, 1988

[54] PRECISION PLATFORM POINTING CONTROLLER FOR A DUAL-SPIN SPACECRAFT

[75] Inventors: Loren I. Slafer, Los Angeles; Douglas J. Bender, Santa Barbara; John F. Yocum, Rancho Palos Verdes all of Calif.

[73] Assignee: Hughes Aircraft Company, Los Angeles, Calif.

[21] Appl. No.: 756,867

[22] Filed: Jul. 18, 1985

[51] Int. Cl.[4] .................................... B64G 1/36

[52] U.S. Cl. .................................... 364/434; 364/459; 244/164; 244/171

[58] Field of Search .................... 364/459, 559, 434; 244/158 R, 164, 171, 167–169

[56] References Cited

U.S. PATENT DOCUMENTS

| | | | |
|---|---|---|---|
| 3,714,434 | 1/1973 | Mears, Jr. et al. | 244/158 |
| 3,757,336 | 9/1973 | Rosen | 244/158 |
| 4,161,780 | 7/1979 | Rudolph et al. | 244/169 |
| 4,617,634 | 10/1986 | Izumida et al. | 244/164 |

*Primary Examiner*—Gary Chin

*Attorney, Agent, or Firm*—S. M. Mitchell; M. J. Meltzer; A. W. Karambelas

[57] ABSTRACT

A pointing apparatus for a dual-spin spacecraft utilizing a first sensor for sensing the time of arrival of an inertial attitude reference as the spinning portion of the spacecraft rotates, and a second sensor for sensing the time of arrival of an index reference which relates the position of the despun portion with the spinning portion. A digital processor estimates the spin rate and phase of the spinning portion from the inertial attitude reference time of arrival, estimates the relative spin rate and phase between the spinning portion and the despun portion from the index reference time of arrival, and estimates the bearing friction bias torque on the motor means which controls the pointing direction of the despun portion of the spacecraft. The spinning portion spin rate and phase estimates are added with the relative spin rate and phase estimates to produce an estimate of the despun portion spin rate and phase, and the despun portion spin rate and phase estimates and the friction bias torque estimates are subtracted from commanded despun portion spin rate, phase and friction bias torque states. A torque command is generated for controlling the motor means from the subtracted estimates.

8 Claims, 27 Drawing Sheets

10
20
14
Spun Shelf
Bipropellant Tanks
18
16
Launch Lock
BAPTA
Struts
Thruster
Battery Shelf
Spacecraft Separation Plane
Axial Thruster
22
12

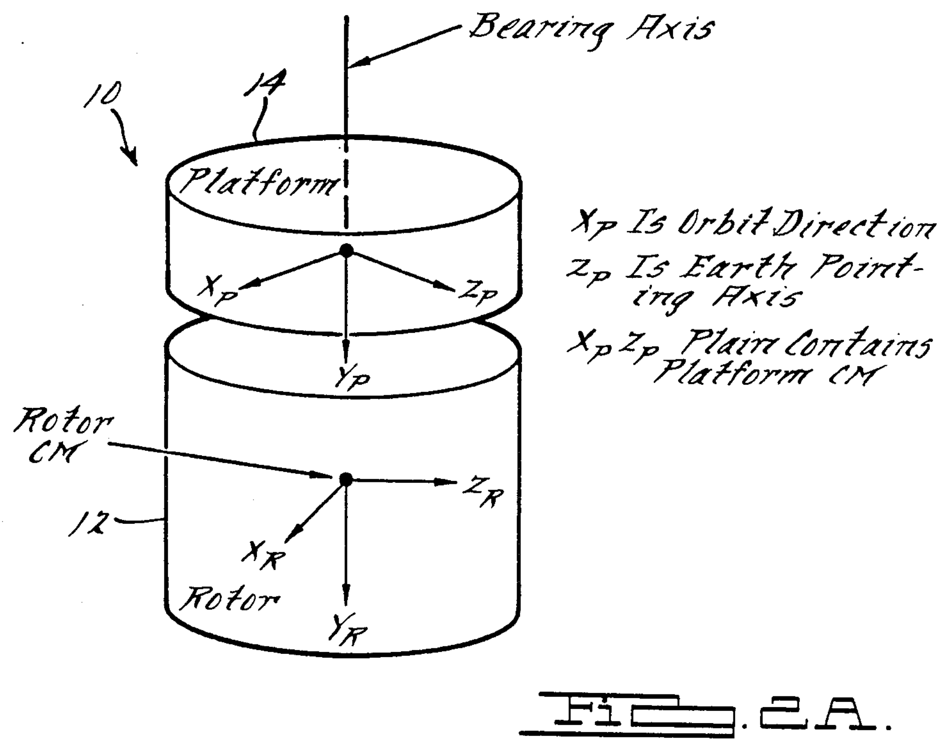
FIG. 2A.
FIG. 2B.
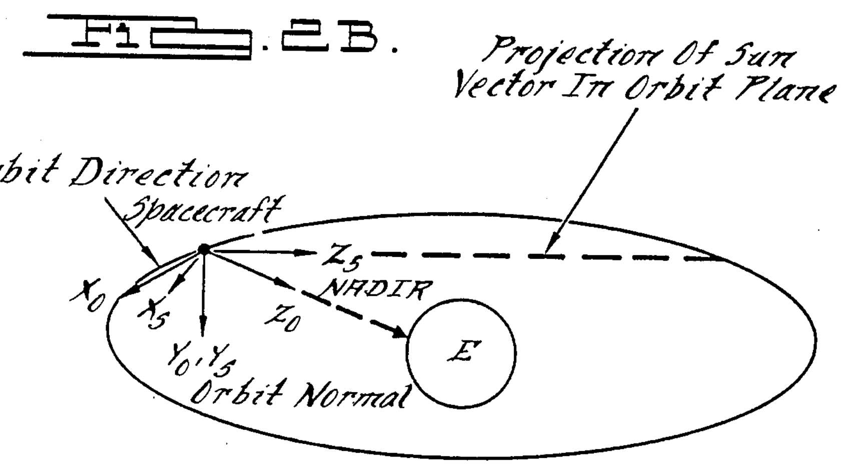

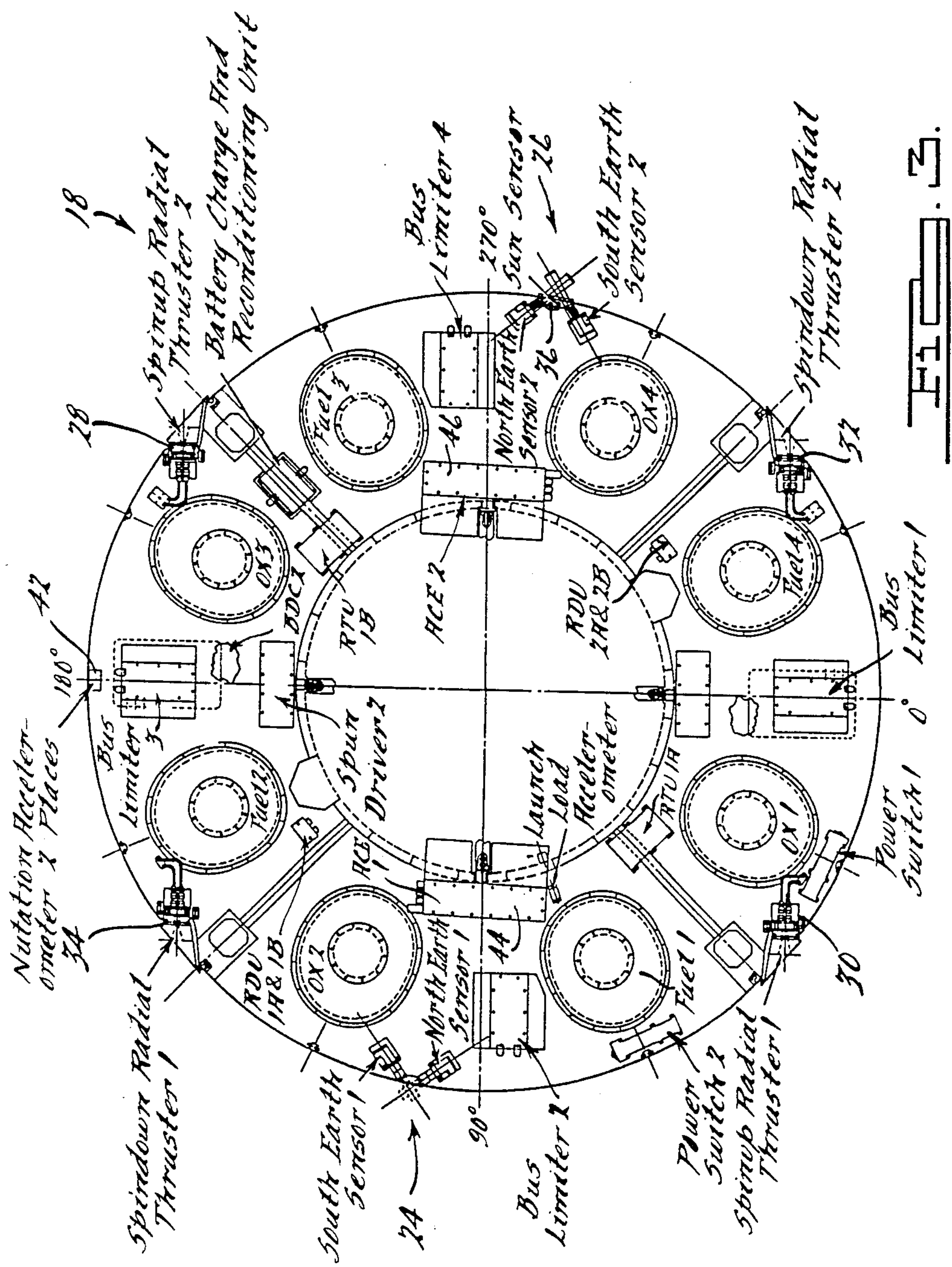
18
Spinup Radial Thruster 2
Battery Charge And Reconditioning Unit
28
Bus Limiter 4
270°
Sun Sensor
26
South Earth Sensor 2
Spindown Radial Thruster 2
32
Fuel 3
46
North Earth Sensor 2
36
OX 4
OX 3
BDC 1
RTU 1B
ACE 2
RDU 2A & 2B
Fuel 4
Bus Limiter 1
42
180°
0°
Nutation Accelerometer 2 Places
Bus Limiter 3
Spin Driver 2
Fuel 2
Launch Load Accelerometer
RTU 1A
OX 1
Power Switch 1
ACE 1
34
Spindown Radial Thruster 1
RDU 1A & 1B
OX 2
North Earth Sensor 1
44
Fuel 1
30
South Earth Sensor 1
24
90°
Bus Limiter 2
Power Switch 2
Spinup Radial Thruster 1
Fig. 3.

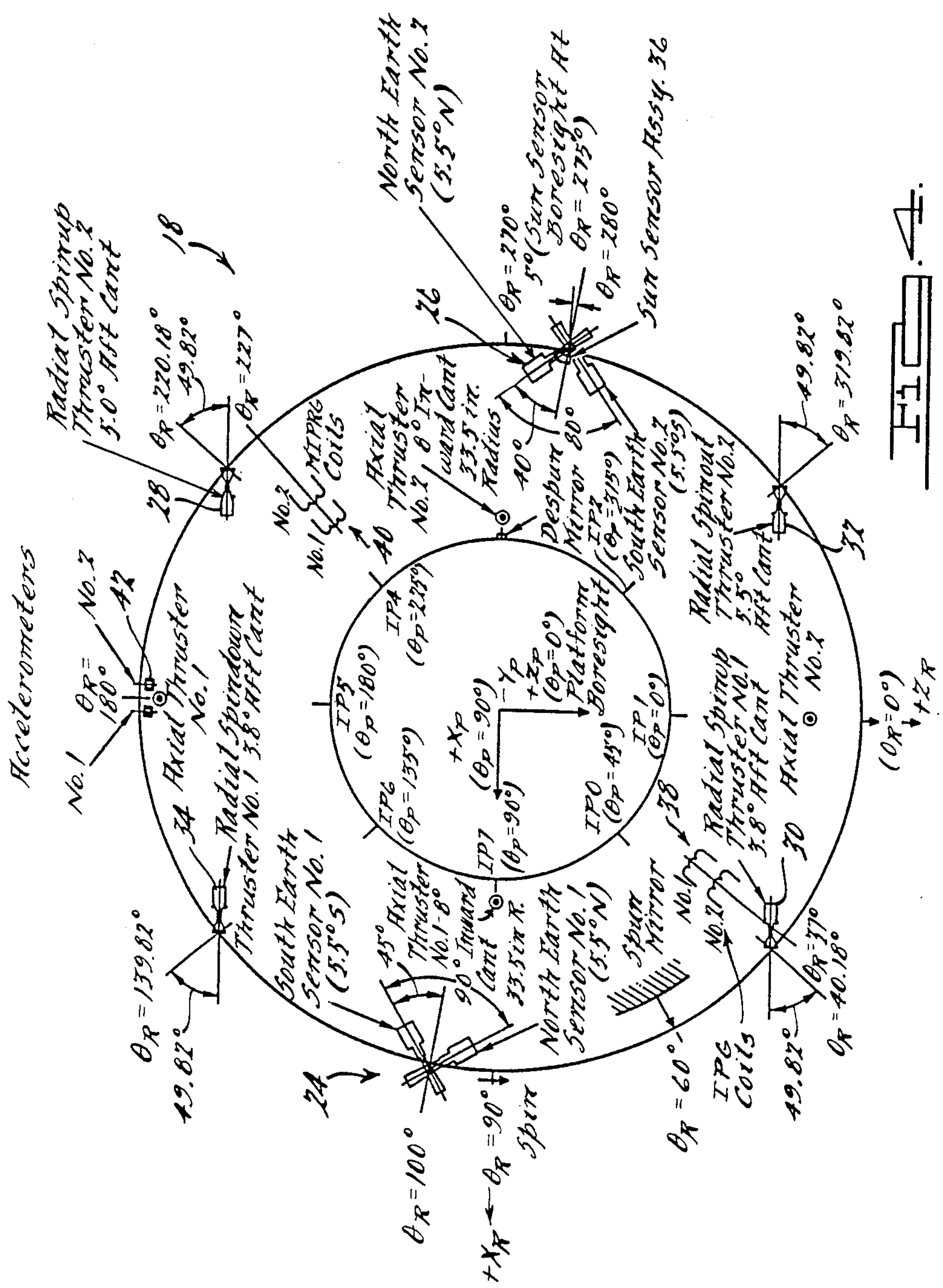
Accelerometers
No. 1
No. 2
42
Axial Thruster No. 1
Radial Spindown Thruster No. 1 3.8° Aft Cant
34
South Earth Sensor No. 1 (5.5°S)
North Earth Sensor No. 1 (5.5°N)
24
26
28
30
32
38
40
18
Spin
Spun Mirror
Despun Mirror
IPG Coils
MIPRG Coils
Radial Spinup Thruster No. 2 5.0° Aft Cant
Radial Spinup Thruster No. 1 3.8° Aft Cant
Radial Spinout Thruster No. 2 5.5° Aft Cant
Axial Thruster No. 2
North Earth Sensor No. 2 (5.5°N)
South Earth Sensor No. 2 (5.5°S)
Sun Sensor Assy. 36
Platform Boresight
$+X_R$
$+Z_R$
$+X_P$
$-Y_P$
$+Z_P$
$\theta_R = 100°$
$\theta_R = 90°$
$\theta_R = 60°$
$\theta_R = 280°$
$\theta_R = 270°$
$\theta_R = 227°$
$\theta_R = 220.18°$
$\theta_R = 139.82°$
$\theta_R = 319.82°$
$\theta_R = 40.18°$
49.82°
$(\theta_R = 0°)$
IP0 $(\theta_P = 45°)$
IP1 $(\theta_P = 0°)$
IP4 $(\theta_P = 225°)$
IP5 $(\theta_P = 180°)$
IP6 $(\theta_P = 135°)$
IP7 $(\theta_P = 90°)$
FIG. 4

Pulse Generator Output Signal
At 30 rpm Into 10 KΩ Load
0.25mm Air Gap (Pole Piece To Iron Exciter)

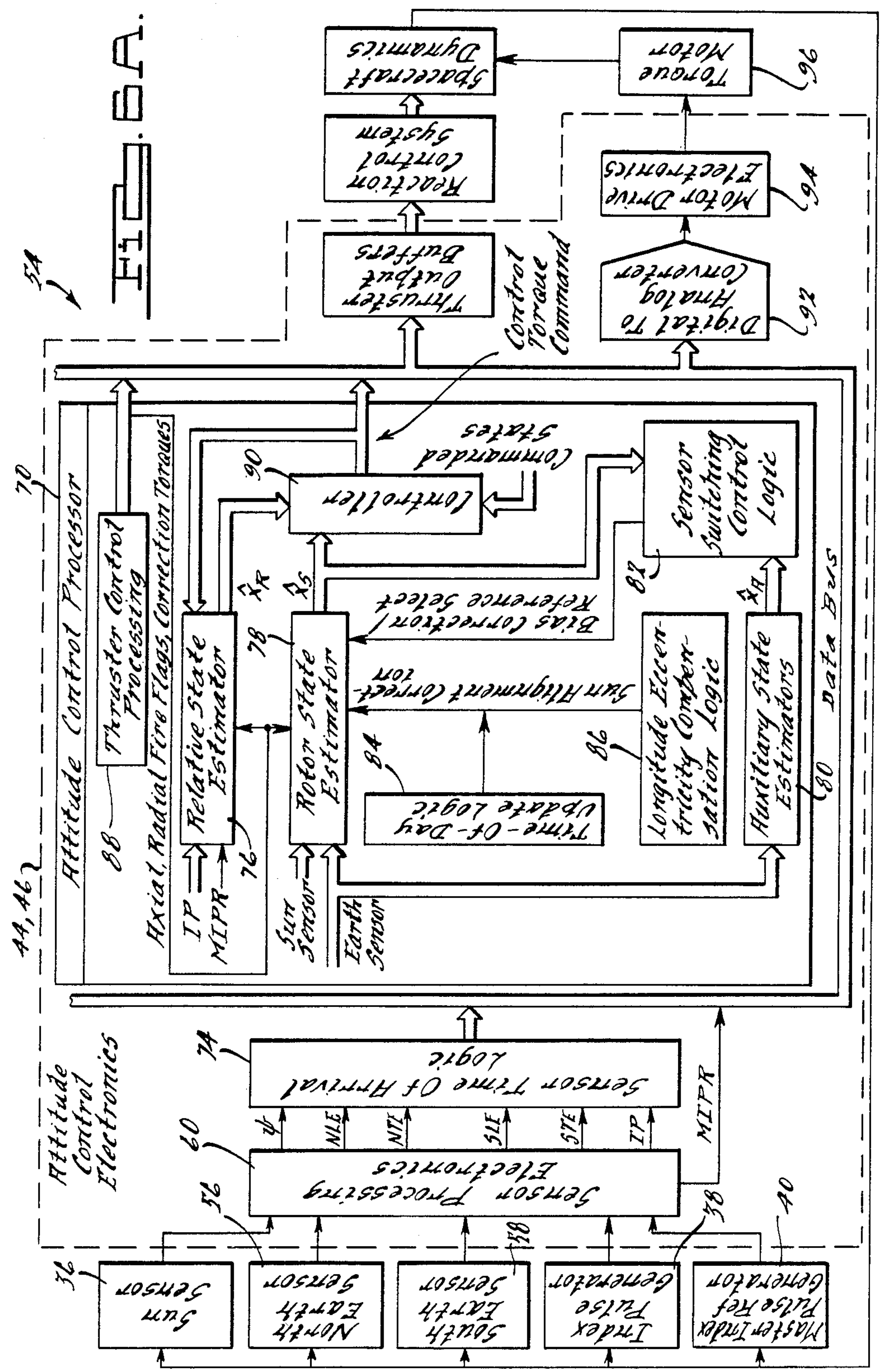
FIG. 8A.
54
Attitude Control Electronics
Attitude Control Processor
70
44, 46
Thruster Control Processing
88
Axial, Radial Fire Flags, Correction Torques
Relative State Estimator
76
IP
MIPR
Rotor State Estimator
78
$X_R$
$X_S$
Sun Sensor
Earth Sensor
Time-Of-Day Update Logic
84
Sun Alignment Correction
Bias Correction/ Reference Select
Longitude Eccentricity Compensation Logic
86
Auxiliary State Estimators
80
$X_A$
Sensor Switching Control Logic
82
Controller
90
Commanded States
Control Torque Command
Data Bus
Thruster Output Buffers
Reaction Control System
Spacecraft Dynamics
Digital To Analog Converter
92
Motor Drive Electronics
94
Torque Motor
96
Sensor Time Of Arrival Logic
74
NLE
NTE
SLE
STE
IP
MIPR
Sensor Processing Electronics
60
Sun Sensor
36
North Earth Sensor
56
South Earth Sensor
58
Index Pulse Generator
38
Master Index Pulse Ref Generator
40

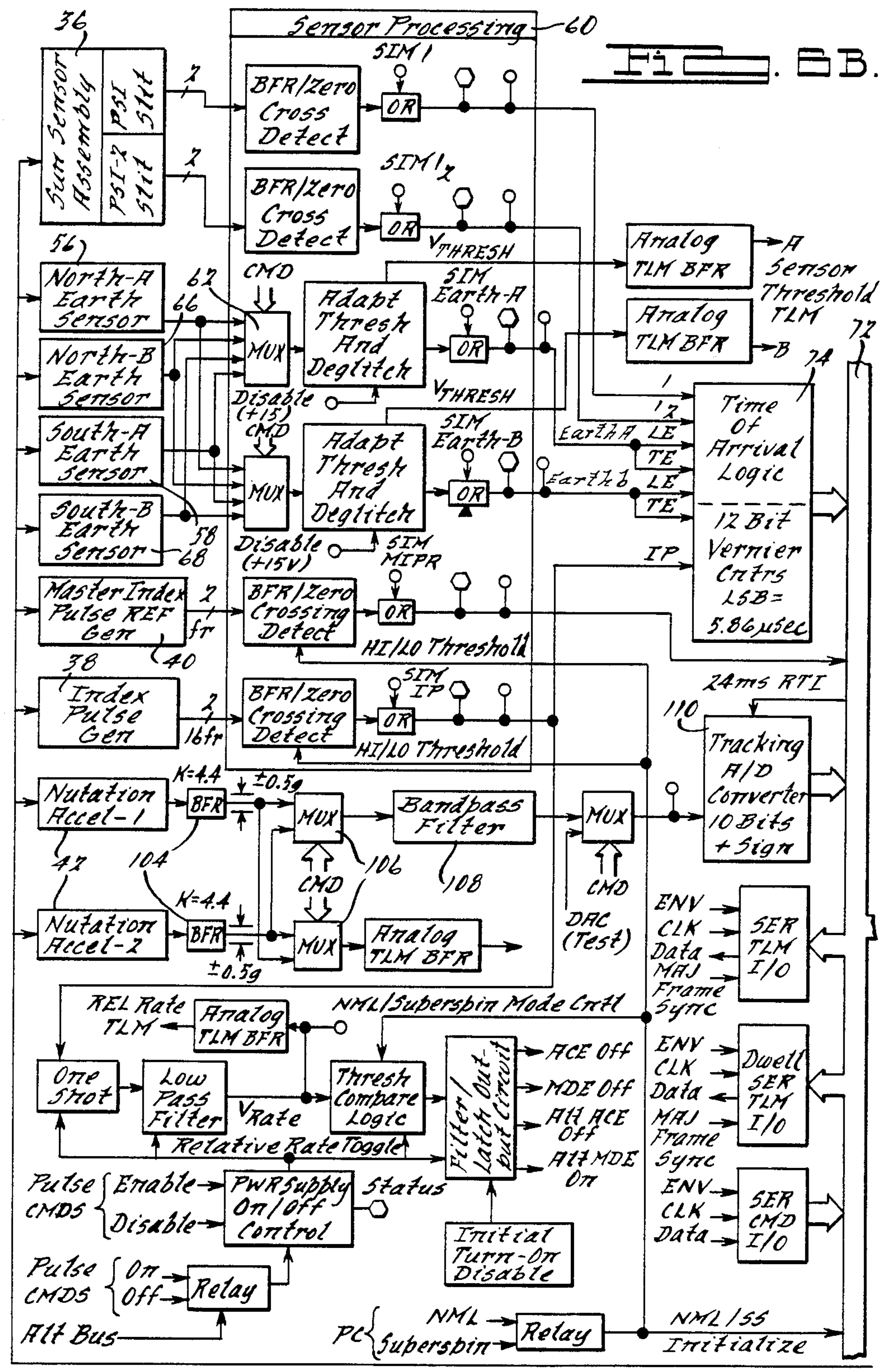
Fig. 8B.
Sensor Processing
Sun Sensor Assembly
PSI Slit
PSI-2 Slit
BFR/Zero Cross Detect
OR
North-A Earth Sensor
North-B Earth Sensor
South-A Earth Sensor
South-B Earth Sensor
MUX
Adapt Thresh And Deglitch
Analog TLM BFR
A Sensor Threshold TLM
Time Of Arrival Logic
12 Bit Vernier Cntrs LSB= 5.86μsec
Master Index Pulse REF Gen
BFR/Zero Crossing Detect
HI/LO Threshold
Index Pulse Gen
Tracking A/D Converter 10 Bits + Sign
24ms RTI
Nutation Accel-1
Nutation Accel-2
Bandpass Filter
CMD
DAC (Test)
SER TLM I/O
Dwell SER TLM I/O
SER CMD I/O
ENV
CLK
Data
MAJ Frame Sync
REL Rate TLM
NML/Superspin Mode Cntl
One Shot
Low Pass Filter
Thresh Compare Logic
Filter/Latch out-put Circuit
ACE Off
MDE Off
Alt ACE Off
Alt MDE On
Relative Rate Toggle
Pulse CMDS
Enable
Disable
PWR Supply On/Off Control
Status
Initial Turn-On Disable
Relay
Alt Bus
PC
NML
Superspin
NML/SS Initialize

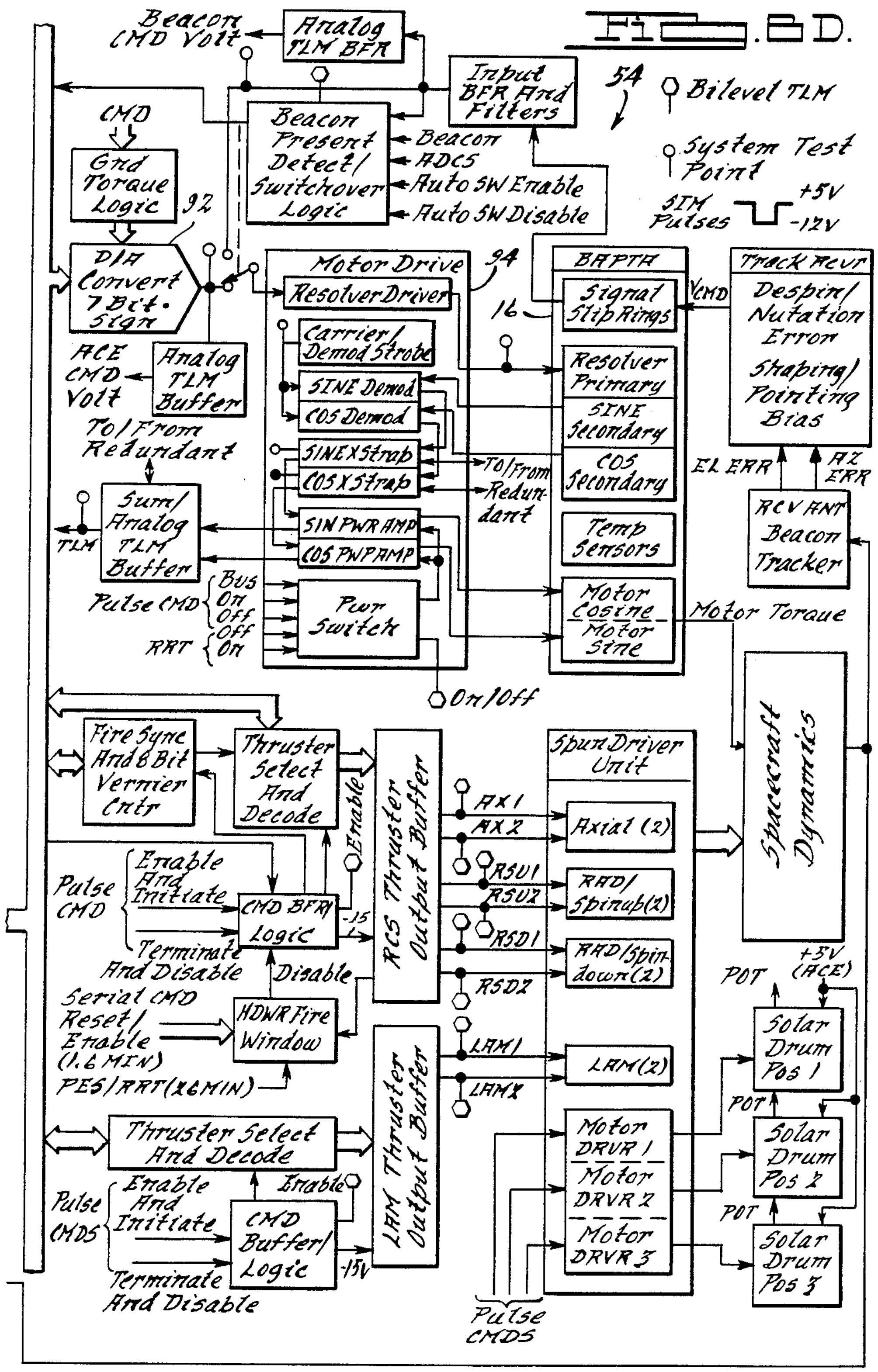
FIG. 8D.
Beacon CMD Volt
Analog TLM BFR
Input BFR And Filters
54
Bilevel TLM
System Test Point
SIM Pulses
+5V
-12V
CMD
Gnd Torque Logic
92
Beacon Present Detect/ Switchover Logic
Beacon
ADCS
Auto SW Enable
Auto SW Disable
D/A Convert 7 Bit. Sign
Motor Drive
94
Resolver Driver
16
BAPTA
Signal Slip Rings
Track Rcvr
VCMD
Despin/ Nutation Error Shaping/ Pointing Bias
ACE CMD Volt
Analog TLM Buffer
Carrier/ Demod Strobe
SINE Demod
COS Demod
Resolver Primary
SINE Secondary
COS Secondary
To/From Redundant
SINE X Strap
COS X Strap
To/From Redundant
EL ERR
AZ ERR
Sum/ Analog TLM Buffer
TLM
SIN PWR AMP
COS PWR AMP
Temp Sensors
RCV ANT Beacon Tracker
Pulse CMD
Bus On Off
RRT Off On
Pwr Switch
Motor Cosine
Motor Sine
Motor Torque
On/Off
Spacecraft Dynamics
Fire Sync And 8 Bit Vernier Cntr
Thruster Select And Decode
RCS Thruster Output Buffer
Spun Driver Unit
AX1
AX2
Axial (2)
Enable
Pulse CMD
Enable And Initiate
Terminate And Disable
CMD BFR Logic
-15
RSU1
RSU2
RAD/ Spinup(2)
RSD1
RAD/Spin-down(2)
RSD2
Disable
POT
+5V (ACE)
Serial CMD Reset/ Enable (1.6 MIN)
HDWR Fire Window
PES/RRT(26MIN)
LAM1
LAM(2)
LAM2
Solar Drum Pos 1
POT
Thruster Select And Decode
LAM Thruster Output Buffer
Motor DRVR 1
Motor DRVR 2
Motor DRVR 3
Solar Drum Pos 2
POT
Pulse CMDS
Enable And Initiate
Enable
CMD Buffer/ Logic
-15V
Terminate And Disable
Solar Drum Pos 3
Pulse CMDS

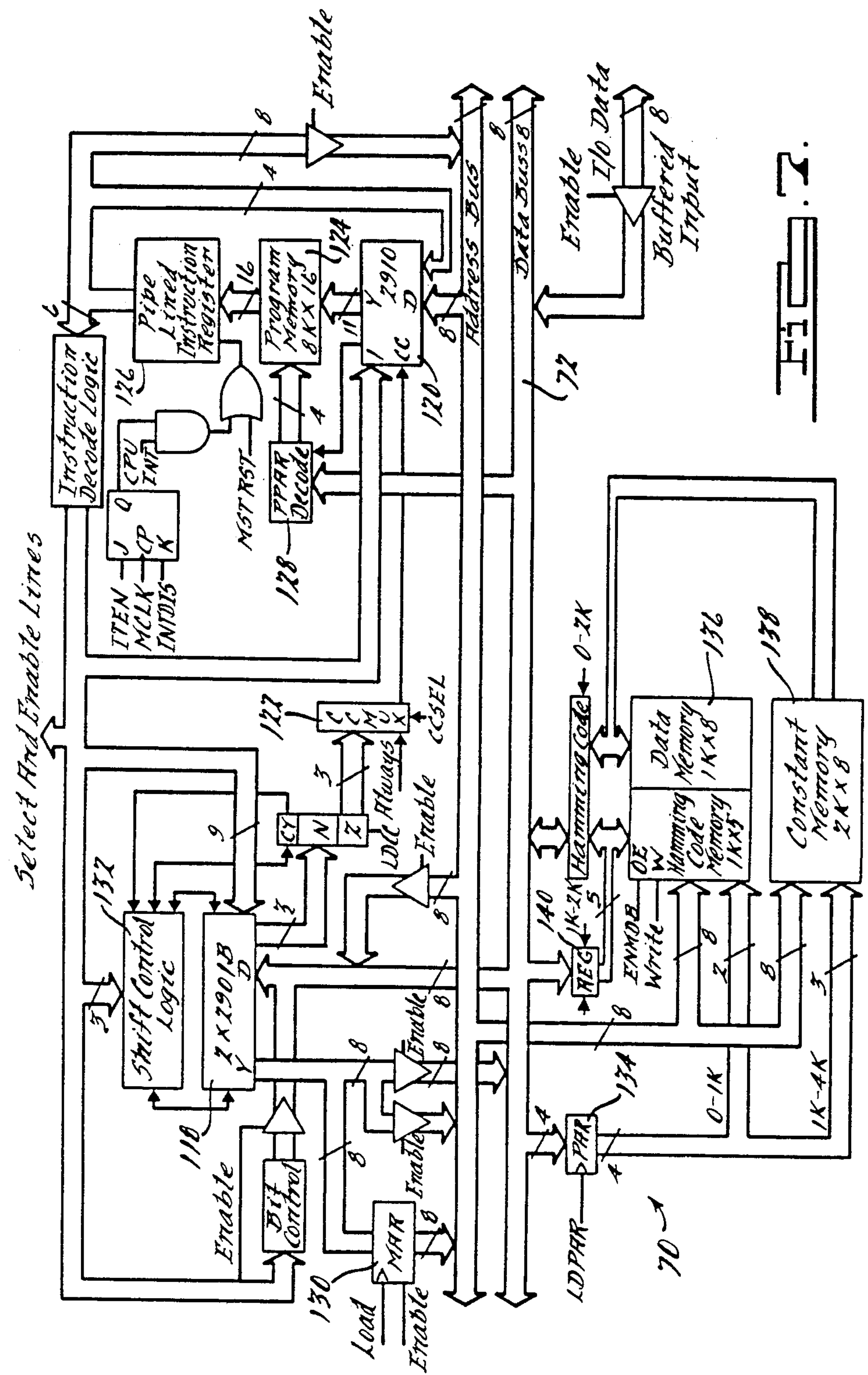
Enable
Address Bus
Data Buss 8
I/O Data
Buffered 8 Input
Instruction Decode Logic
Pipe Lined Instruction Register
Program Memory 8KX16
2910
PPAR Decode
MST RST
CPU INT
ITEN
MCLK
INTDIS
Select And Enable Lines
CCMUX
CCSEL
LDCC Always
Shift Control Logic
2X2901B
Bit Control
MAR
Load
PAR
LDPAR
REG
Hamming Code
Hamming Code Memory 1KX5
Data Memory 1KX8
Constant Memory 2KX8
Write
0-1K
1K-4K
0-2K
1K-2K Rotor State Estimator
Inner Loop Compensator
Relative State Estimator
Nutation Accelerometer
Spacecraft Dynamics And Kinematic Coupling
Earth Or Sun Sensor
Shaft Angle Encoder
Torque Motor
DAND
Controller
Command
Notch Filter
Alignment
Sensor
Rotor
Platform

FIG. 12A.

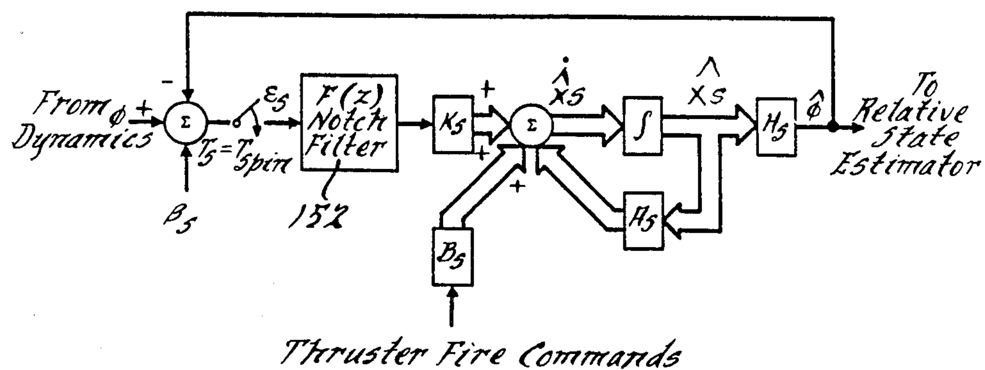

Nomenclature:

$X_S = \begin{pmatrix} \phi \\ \Omega \end{pmatrix}$ $\phi$ = Rotor Phase $\Omega$ = Rotor Rate $A_S = \begin{bmatrix} 0 & 1 \\ 0 & 0 \end{bmatrix}$ $B_S = \begin{bmatrix} 0 \\ 1/I_S \end{bmatrix}$ $H_S = \begin{bmatrix} 1 & 0 \end{bmatrix}$ $T_S$ = RSE Sample Period, One Revolution $I_S$ = Rotor Spin-Axis Moment Of Inertia $\varepsilon_S$ = Sensor Measurement Residual $\beta_S$ = Sensor Alignment Angle $K_S = \begin{bmatrix} K_\phi \\ K_\Omega \end{bmatrix}$, Rotor State Estimator Gain Vector Sun Mode: $K_\phi = 0.8$, $K_\Omega = 0.2 sec^{-1}$ Earth Mode: $K_\phi = 0.36$, $K_\Omega = 0.02 sec^{-1}$ Propagation: $\dot{\hat{X}}_S = A\hat{X}_S$ Correction: $\hat{X}_S^+ = \hat{X}_S^- + K_S(\phi^- - \hat{\phi}^-)$ Discrete Dynamics: $F = e^{A_S T_S} = \begin{bmatrix} 1 & T_S \\ 0 & 1 \end{bmatrix}$ $$G = \int_0^{T_S} e^{A_S(T_S - r)} B_S \, dr = \begin{bmatrix} T_S^2/2I \\ T_S/I \end{bmatrix}$$

FIG. 12B.

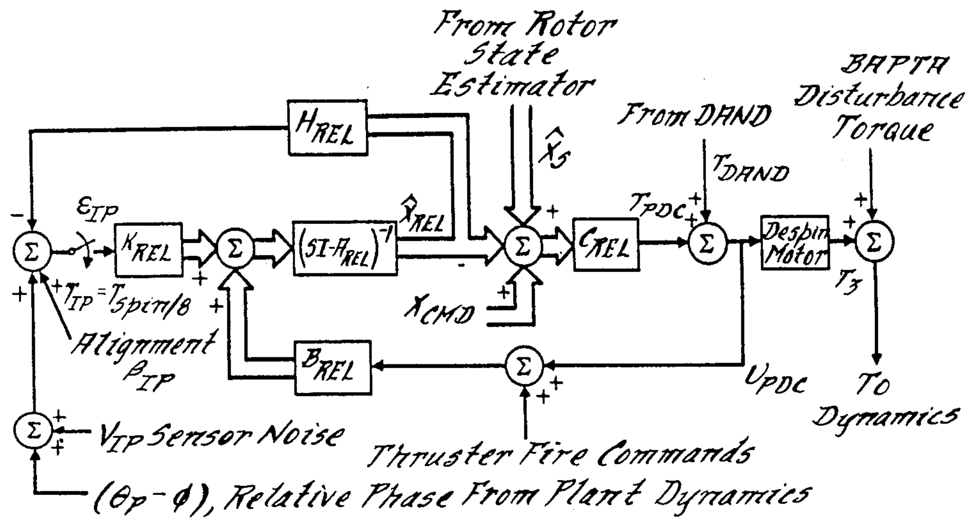

Nomenclature:

$$X_{REL} = \begin{pmatrix} \theta - \phi \\ \omega - \Omega \\ b \end{pmatrix} = \begin{pmatrix} \theta_{REL} \\ \omega_{REL} \\ b \end{pmatrix}$$

$\theta$ = Platform Phase   $\phi$ = Rotor Phase $\omega$ = Platform Rate   $\Omega$ = Rotor Rate $b$ = BAPTA Bias Torque $$X_{CMD} = \begin{pmatrix} \theta \\ \omega \\ 0 \end{pmatrix}$$

$U_{PDC}$ = Computed Despin Torque Command $\varepsilon_{IP}$ = IP Measurement Residual   $\beta_{IP}$ = IP Alignment Angle $I_{REL}$ = Relative Platform-To-Rotor Inertia $= I_P I_S / (I_P + I_S)$ $H_{REL} = (1\,0\,0)$   $C_{REL} = (C_P\, C_R\, 1)$, $K_{REL} = \begin{pmatrix} K_\theta \\ K_\omega \\ K_b \end{pmatrix}$ Propagation: $\dot{\hat{X}}_{REL} = A_{REL}\hat{X}_{REL} + B_{REL}(U_{PDC} + T_F)$ Correction: $\hat{X}^+_{REL} = \hat{X}^-_{REL} + K_{REL}(\theta^-_{REL} - \hat{\theta}^-_{REL})$ $$A_{REL} = \begin{pmatrix} 0 & 1 & 0 \\ 0 & 0 & 1/I_{REL} \\ 0 & 0 & 0 \end{pmatrix}, \quad B_{REL} = \begin{pmatrix} 0 \\ 1/I_{REL} \\ 0 \end{pmatrix}$$

Discrete Dynamics:

$$F_{REL} = e^{(A_{REL} T_{IP})} = \begin{pmatrix} 1 & T_{IP}/I_{REL} & (T_{IP})^2/2I_{REL} \\ 0 & 1 & T_{IP}/I_{REL} \\ 0 & 0 & 1 \end{pmatrix}$$

$$G_{REL} = \int_0^{T_{IP}} e^{A_{REL}(T_{IP}-\tau)} B_{REL}\, d\tau = \begin{bmatrix} (T_{IP})^2/2I_{REL} \\ T_{IP}/I_{REL} \\ 1 \end{bmatrix}$$

FIG. 13B.

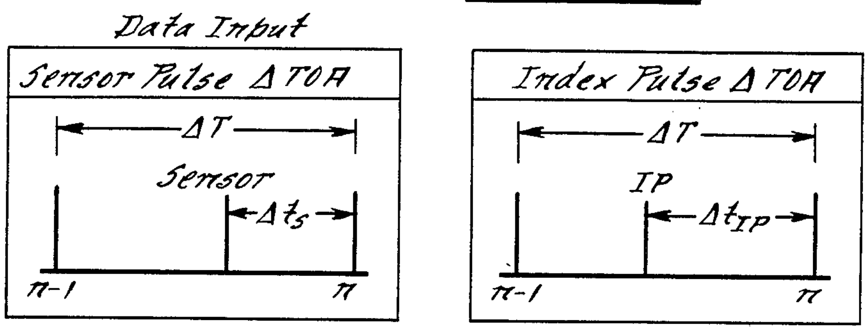

SIR = Selected Inertial Reference
- $\beta_{PSI}$ = Time Of Day Correction Angle + Alignment Bias
- $\beta_{IP}$ Is Critical; Compute At RTI Occurance TDUPDT = Time-Of-Day Update Period
$A_0$ = Satellite Orbit Angle ($\Delta A_0 = 2.5°$)
$\Delta T$ = Real Time Interrupt Period States (Inertial)
$\phi$ = Rotor Spin Phase
$\Omega$ = Rotor Spin Rate
$\theta$ = Relative Platform-To-Rotor Phase, $\theta_p - \phi$
$\omega$ = Relative Platform-To-Rotor Rate, $\omega_p - \Omega$
$b$ = BAPTA Bias Torque Control
$T_{DAC}$ = Total DAC Commanded Torque
$T_{QAVG}$ = Average DAC Commanded Torque
$U_{PDC}$ = Feedback Torque To RSE DAND Inputs
$T_{DAND}$ = DAND Torque Command Thruster Torque Inputs
$V_{AJ}$ = Velocity Change Due To Axial Jet
$F_{AJ}$ = Axial Jet Flag
$V_{RJ}$ = Velocity Change Due To Radial Jet
$F_{RJ}$ = Radial Jet Flag Operational Constraints
- $T_p = 0$ If CMDRAT ≠ 0
- No Update To $\hat{b}$ In Beacon Reference Mode
- $+20.142$ RPM $< \hat{\Omega}, \hat{\Omega}_{A,B} <$ $+44.86$ RPM
- $4.88$ RPM $< |\hat{\omega}| <$ $50.049$ RPM
- NABHW TODUPDATE = COMMANDED UPDATE PERIOD (10 BITS) = [0.768000 sec, 1.536000 sec] WITH LSB = 23.475 μsec INT = Integer Function

PRECISION PLATFORM POINTING CONTROLLER FOR A DUAL-SPIN SPACECRAFT

TECHNICAL FIELD

The present invention generally relates to an apparatus and method for controlling the pointing direction of a dual-spin satellite, and particularly relates to a high accuracy platform pointing controller and method which utilizes firmware implemented state estimator algorithms that are based upon time of arrival data from sun or earth sensors and relative motion index pulses.

MICROFICHE APPENDIX

This application includes a microfiche appendix of the firmware used in one embodiment of the invention.

BACKGROUND OF THE INVENTION

A dual-spin satellite is a stabilized, or unstabilized, orbiting device having a spinning portion or rotor, and a despun portion or platform. However, other configurations are possible wherein only an antenna is despun. The two portions are coupled together by a despin bearing and power transfer assembly (BAPTA) whose axis is parallel to the spin vector. The platform or antenna is usually pointed at a predetermined position on the earth, or at another satellite, or the like. Accurate control of the pointing position of the platform is critical to satellite operation.

The pointing position of the dual-spin satellite may be controlled by controlling the relative rate and relative position or phase of the payload platform with respect to the spinning rotor. Prior art satellite pointing control systems include an open-loop system which provides for operator control of motor torque commands applied to an orbiting satellite from an earth station. The operator manipulated the rotation rate of the payload platform with respect to the earth to a low level, after which a position control loop controls the pointing position of the platform.

Another system provides for a position control loop which is utilized when the pointing direction of the platform is within a predetermined angular extent (dead band), while fixed torque signals are applied outside of the dead band. The angular extent of the dead band is based upon the relative rotational rate between the payload platform and rotor. A further control system is described in the commonly owned U.S. Pat. No. 4,437,047, issued on Mar. 13, 1984 to John W. Smay, which is hereby incorporated by reference. This control system utilizes a closed-loop feedback system which employs both position and rotation rate information to control the pointing position of a payload platform of a dual-spin satellite. In this system, index pulses and earth pulses are utilized to generate error signals which in turn produce position torque command signals.

Another control system utilizes a phase locked loop which phase locks an index pulse train to an inertial sensor pulse train that indicates a known position. For multiple index pulses, this system can lock an inertial pulse to any index pulse. The system allows for manual stepping to any desired pulse which provides the correct pointing direction. One system which utilizes an analog phase locked loop circuit to provide an inertial reference for platform pointing control is described in "Attitude and Payload Control System for the Leasat Naval Communications Satellite", by Loren I. Slafer, presented at the Annual Rocky Mountain Guidance and Control Conference, 1982, American Astronauticl Society, AAS 82-007. This publication is hereby incorporated by reference.

It is a principle object of the present invention to provide a platform pointing controller and method for a dual-spin satellite which achieves high pointing control accuracy without requiring an RF beacon reference.

It is another object of the present invention to provide a precision platform pointing controller which is capable of transient free switching between earth and sun inertial attitude references.

It is an additional object of the present invention to provide a precision platform pointing controller which utilizes existing sensors and actuators mounted to the spinning portion of the spacecraft without requiring a despun platform mounted inertial sensor.

It is a further object of the present invention to provide a precision platform pointing controller which employs digital error detection and processing utilizing state estimator/controller algorithms.

It is yet another object of the present invention to provide a precision platform pointing controller which utilizes an onboard firmware driven microprocessor to substantially improve overall system performance in comparison to prior controller techniques.

It is still another object of the present invention to provide a precision pointing controller which implements despin and nutation control functions in microprocessor firmware to realize substantial hardware savings and to substantially improve design flexibility, as well as to achieve a more precise implementation of these control functions.

It is still a further object of the present invention to provide a precision pointing controller which utilizes firmware to compensate for disturbances due to thruster firings and nutational movement, and firmware to correct for longitude drift and orbit eccentricity when a sun sensor is being used as the inertial attitude reference.

SUMMARY OF THE INVENTION

To achieve the foregoing objects, the present invention provides a pointing apparatus for a dual-spin spacecraft which utilizes first input means for sensing the time of arrival of an inertial attitude reference as the spinning portion of the spacecraft rotates, and second input means for sensing the time of arrival of an index reference which relates the position of the despun portion with the spinning portion. A principle feature of the pointing apparatus is the provision of digital processing means for estimating the spin rate and phase of the spinning portion from the inertial attitude reference time of arrival, for estimating the relative spin rate and phase between the spinning portion and the despun portion from the index reference time of arrival, and for estimating the bearing friction bias torque on the motor means which controls the pointing direction of the despun portion of the spacecraft. The pointing apparatus also includes first summation means for adding the spinning portion spin rate and phase estimates with the relative spin rate and phase estimates to produce an estimate of the despun portion spin rate and phase, and first subtraction means for subtracting the despun portion spin rate and phase estimates and the friction bias torque estimates from ground commanded despun portion spin rate, phase and friction bias torque states. The pointing apparatus further includes command means for generating a torque command for controlling the motor means from the subtracted estimates.

In one embodiment of the present invention, the platform pointing controller is capable of utilizing either the sun or the earth as an inertial attitude reference, and the digital processing means comprises a firmware driven microcomputer. This unique system mechanization permits the achievement of high pointing control accuracy (0.06°, $3\sigma$) using existing, flight-proven sensors and actuators mounted to the spinning portion of the spacecraft. The sensors provide time of arrival values which are read into the microcomputer to provide a data base for the control loop processing algorithms, as well as the measurement and formatting of attitude data for ground station processing.

An earth center finding technique is used when operating with an earth sensor as the inertial reference to uncouple spin axis attitude errors from platform azimuth pointing error determination. When a sun sensor is used as the inertial reference, a digital notch filter is provided within the rotor state estimator to remove geometric sun sensor coupling at the nutation frequency for enhanced attitude stabilization. The microcomputer also provides for an algorithm to correct for a constantly varying solar angle when the sun sensor is used as the inertial reference. Longitude drift/orbit eccentricity algorithms also provide ground station programmable time-varying bias profiles which adjust the internal sun sensor alignment reference to compensate for variations in both earth and satellite orbit characteristics that would otherwise produce excessive platform pointing errors.

The firmware defined state estimators are mechanized to estimate the critical dynamic states of the spacecraft-rotor rate and phase, relative rate and phase, and bearing friction torque. The estimated state variables are compared to a set of ground commanded states and the difference defines the system errors which drive the controller output. The controller output is a linear combination of the state errors and represents the feedback command to the BAPTA torque motor. This value is output by the microcomputer to a digital to analog converter which drives the motor drive electronics controlling the BAPTA motor.

This dual-loop multi-rate sampling estimator/controller design provides for rejection of both input sensor noise and the bearing torque disturbances. The firmware also provides control logic to provide transient-free switching between the earth and sun sensors. This control logic includes auxiliary state estimators to monitor the rotor spin phase and rate using the non-controlling sensor reference, and this control logic automatically adjusts the internal biases to insure a zero error condition when a ground command is received to change the sensor reference.

Platform pointing disturbances resulting from thruster firings are also minimized by the use of an automatic compensation algorithm within the platform pointing control firmware. The compensator uses a feed forward torque scheme which adjusts the internal state estimates whenever a thruster is being fired, forcing the estimates to follow the rapidly changing true state. The correction torque value is a ground programmable value derived from on-orbit thruster calibration data. Using this technique, the estimator/controller dynamics are required to only track out small-residual errors, with minimum effects on platform pointing.

Additional advantages and features of the present invention will become apparent from a reading of the detailed description of the preferred embodiment which makes reference to the following set of drawings in which:

BRIEF DESCRIPTION OF THE DRAWINGS

FIG. 2A is a diagrammatic representation of the spacecraft of FIG. 1, which particularly illustrates the spacecraft coordinates.

FIG. 2B is a graphical representation of the spacecraft coordinates in relation to its earth orbit.

FIG. 3 is a top elevation view of the spun shelf shown in FIG. 1.

FIG. 4 is a diagrammatical representation of the spun shelf which particularly illustrates the sensor and actuator geometry.

FIG. 6A is a simplified block diagram of the precision platform controller according to the present invention.

FIGS. 6B–6D show a more detailed block diagram of the platform pointing controller shown in FIGS. 5A–5F.

FIG. 7 is a block diagram of the attitude control processor shown in FIGS. 6A and 6B–6D.

FIG. 12A is an analytical model of the rotor state estimator portion of the analytical model shown in FIG. 11.

FIG. 12B is an analytical model for the relative state estimator portion of the analytical model shown in FIG. 11.

FIGS. 13A–13E are flow charts illustrating the pointing control algorithms used in the platform pointing controller according to the present invention.

FIG. 16 is a partial block diagram of the platform pointing controller which particularly illustrates the transient-free sensor switching according to the present invention.

DETAILED DESCRIPTION OF THE PREFERRED EMBODIMENT

Figure 1:
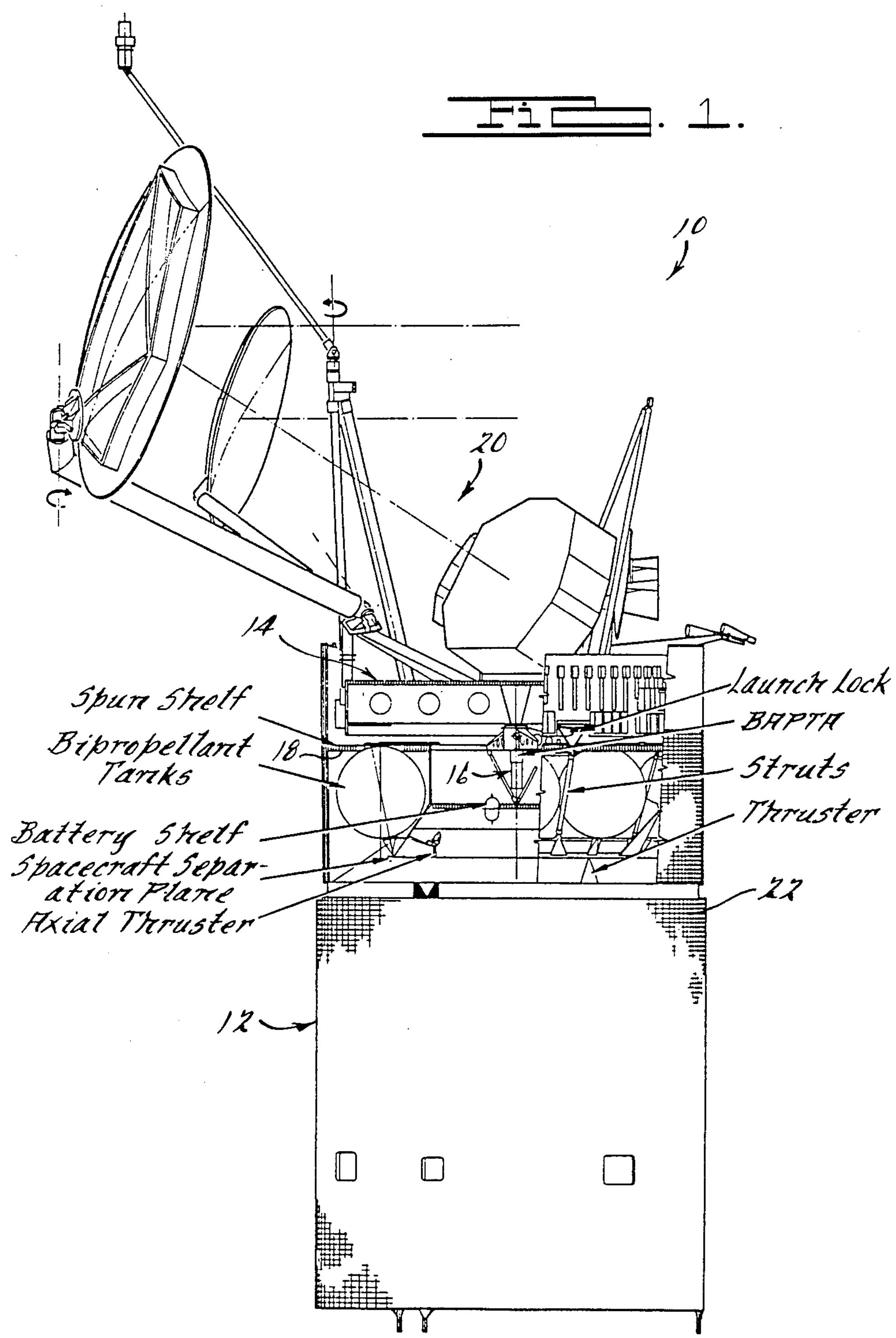
FIG. 1 is a side elevation view of a dual-spin spacecraft configuration which utilizes a platform pointing controller according to the present invention.

Referring to FIG. 1, a side elevation view of a satellite or spacecraft 10 having a precision platform pointing controller according to the present invention is shown. The spacecraft 10 includes a spinning rotor 12 which contains most of the utility subsystems (power, propulsion, attitude and payload pointing control), and a large despun platform 14 containing the communications and telemetry subsystems. A bearing and power transfer assembly (BAPTA) 16 provides the rotating mechanical and electrical interface between the spinning portion 12 and the despun portion 14 of the satellite 10.

The BAPTA 16 includes the bearings and structure which support the despun platform 14, and brushless torque motors which despin and control the pointing of the platform in response to torque commands generated by the platform pointing controller. The BAPTA 16 also includes an electrical contact ring assembly which provides slip rings for electrical power and signal transfer across the rotating joint, and two pulse generators which provide relative angle information between the spinning and despun portions of the spacecraft. One of these generators is a Master Index Pulse Reference generator which generates one pulse per spin cycle, and the other generator is an index pulse generator which generates eight pulses per revolution.

FIG. 1 also shows the spun shelf 18 which will be described in more detail in connection with FIGS. 3 and 4. Additionally, FIG. 1 illustrates the several antennas and reflectors generally designated at reference numeral 20, which the spacecraft 10 is capable of carrying. Electrical power for the spacecraft 10 is provided by rotor-mounted solar panels 22, and rechargeable batteries to provide power during eclipse operations.

Referring to FIGS. 2A and 2B, these diagrammatic representations illustrate the coordinate system for the spacecraft 10. In one embodiment according to the present invention, the spin direction of the rotor is positive counterclockwise, since the earth's rotation and the earth's orbit around the sun are also positive counterclockwise. It should also be noted that in this embodiment the spacecraft 10 is designed to be deployed in a geostationary or synchronous orbit around the earth.

Referring to FIG. 3, a top elevation view of the spun shelf 18 is shown. FIG. 4 also shows the general layout of the components on the spun shelf 18 in terms of the spacecraft coordinates shown in FIGS. 2A and 2B. These figures also show the use redundant components in the spacecraft for enhanced reliability. For example, the spacecraft is provided with two pairs of earth sensors 24 and 26, two spin up radial thrusters 28 and 30, and two radial spin down thrusters 32 and 34. These figures also illustrate a sun sensor assembly 36 which includes two pair of sun sensors. FIG. 4 also illustrates the IPG coils of the index pulse generator 38 which are used to generate the index pulses, and the MIPRG coils of the Master Index Pulse generator 40 which are used to generate the master index pulse per revolution. A further discussion of the structure of the sun and earth sensors, as well as the BAPTA motor, may be found in the "Attitude and Payload Control System For The LEASAT Naval Communications Satellite" publication referred to above.

FIGS. 3 and 4 also show the two accelerometers 42 provided for the spacecraft 10. These accelerometers employ a pendulous mass mechanism to sense nutational movement of the spacecraft. With the platform despun, the accelerometers will sense spacecraft nutation at the rotor nutation frequency. FIG. 3 also shows the enclosures for the two attitude control electronics (ACE) units 44 and 46 for the spacecraft 10. The redundant ACE units 44 and 46 each contain a platform pointing controller in accodance with the present invention, as will be more fully described below.

Since the earth and sun sensors are mounted to the spun shelf 18 of the spinning rotor portion 12, these sensors provide spin axis attitude data for the spacecraft 10. The earth sensors 24 and 26 are preferably narrow band infrared radiometers which are capable of detecting the infrared energy level of the warm earth against the cold background of space. Each of these earth sensors produce an analog output pulse as the pencil-beam ($1.5° \times 1.5°$) sensor field of view scans the earth in azimuth. The peak amplitude of the sensor output is proportional to the energy received from the earth, and the pulse width is proportional to the angular width of the scan portion of the earth.

Figure 5A:
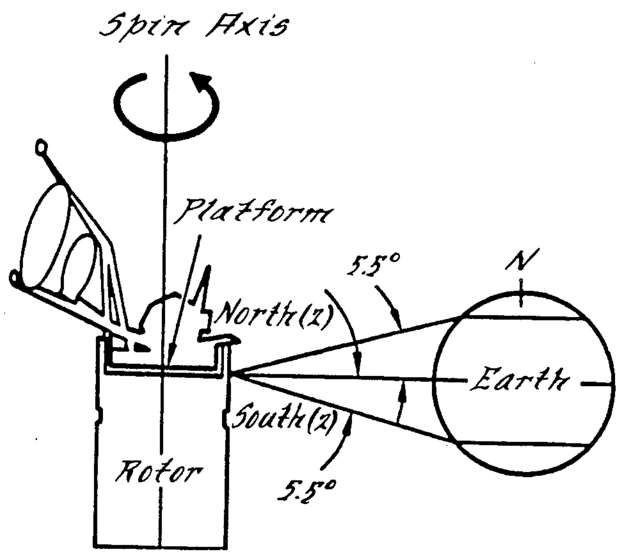
FIGS. 5A–5F are diagrammatical representations of the input sensor geometry and output signal characteristics for the earth, sun and encoder sensors.
Figure 5B:
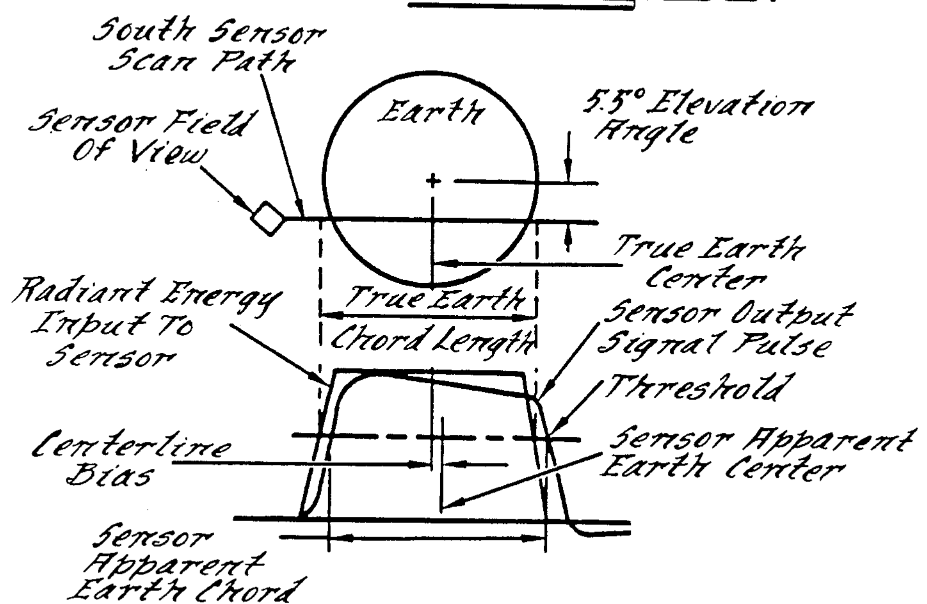

As shown in FIG. 5A, the north earth sensor is orientated at a $+5.5°$ angle and the south earth sensor is orientated at a $-5.5°$ angle from a plane normal to the spacecraft spin axis. This orientation permits selection from the ground station of the sensor to be used in order to avoid sun or moon interference, as well as to provide adequate redundancy (only one earth sensor being required for despin control). FIG. 5B illustrates the analog output pulse generated by the earth sensor. This analog output pulse is converted to a digital earth chord signal using an adaptive threshold technique once per rotor spin revolution. This digital earth chord signal defines the space-earth (earth leading edge), and earth-space (earth trailing edge) transitions as the sensor field of view scans across the earth.

The sun sensor assembly 36 comprises two sub-assemblies which in turn each contain two independent sensors in a common enclosure to produce redundant zero crossing output signals. These redundant sun pulses are used for both spin reference and attitude determination. Each of these sun sensors is a silicon photovoltaic cell which is provided with a double slit opening to produce a narrow fan-shaped field of view of approximately $4° \times 90°$. These sensors are geometrically orientated to produce a null plane or zero crossing plane in the middle of the field of view.

Figure 5C:
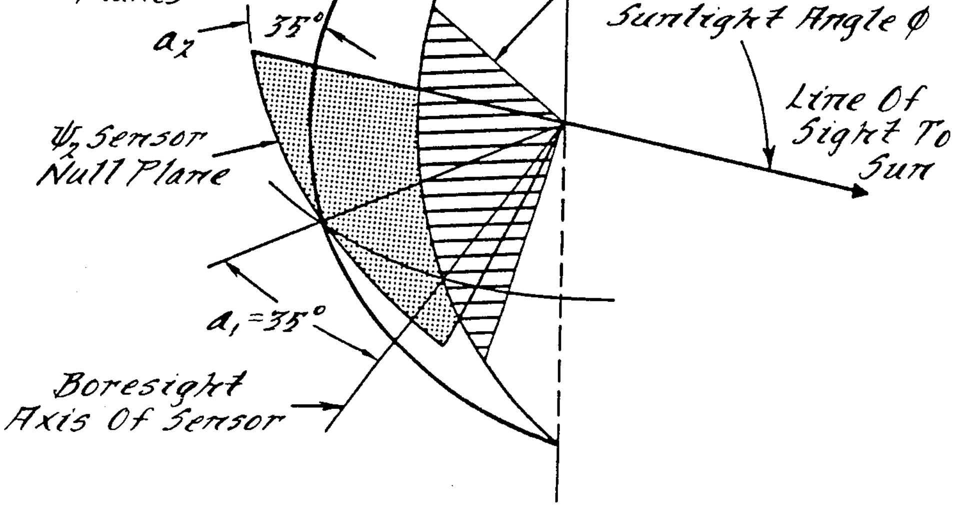

As the spinning section 12 of the satellite rotates the sensor past the sun, a current doublet (shown in FIG. 5B) is produced from each slit pair. These pulses are amplified, and each negative going zero crossing point is detected in the ACE units 44–46. The sun sensors are used in pairs to provide redundant pulse pairs ($\psi$, $\psi_2$) once per spacecraft revolution. The angular relationship (time relationship) between the $\psi$ and $\psi_2$ sensor planes is used as a measure of the polar sun angle between the sun line-of-sight and the spacecraft spin axis. As shown in FIG. 5C, the sub-assembly containing the $\psi$ sun sensors is orientated such that its null planes are nominally parallel to the satellite spin axis. Thus, the $\psi$ pulses occur at nominally the same azimuth angle for the sun polar angle $\phi$ of $90° \pm 45°$ from the spin axis. These pulses are used as a despin reference on board the satellite. The sun sensor sub-assembly is canted 35° and rotated in azimuth 35° relative to the $\psi$ sensor null planes. Consequently, the azimuth angle at which the $\psi_2$ pulses occur varies with the sun angle $\phi$.

Preferably, the sun sensors are calibrated after assembly using the sun as a source. The sensor assembly is mounted on a theodolite which is, in turn mounted on an equatorial mount. When the sun sensor assembly is mounted on the spacecraft, it is aligned using the calibration data. By using the pulses from the sun sensors and the equation illustrated in FIG. 5C, the attitude of the spacecraft relative to the sun can be determined with a high degree of accuracy.

Figure 5E:
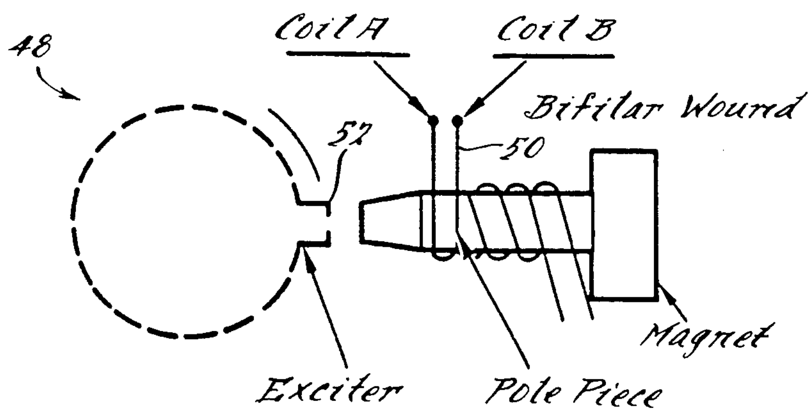
Figure 5D:
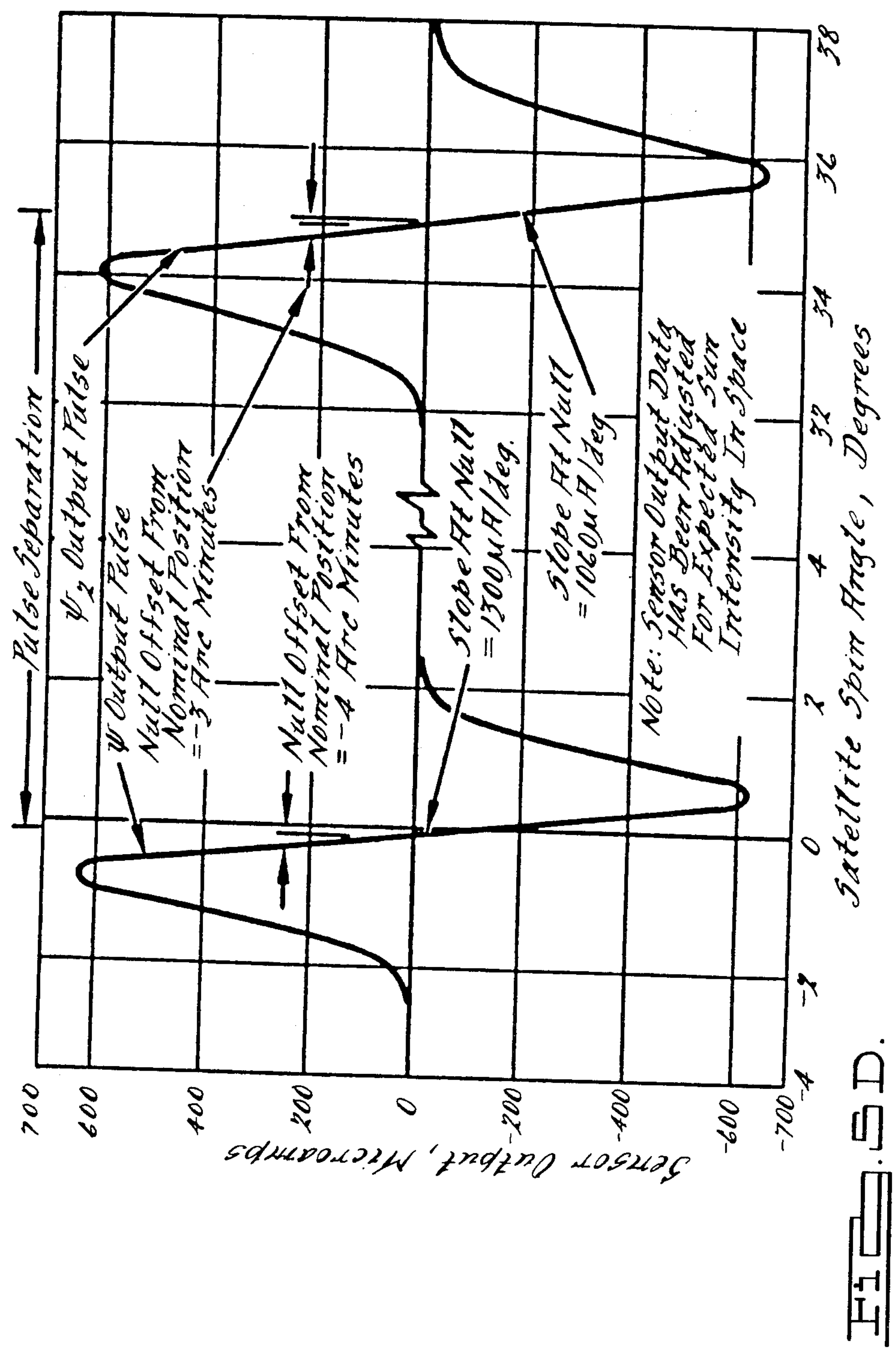
Figure 5F:
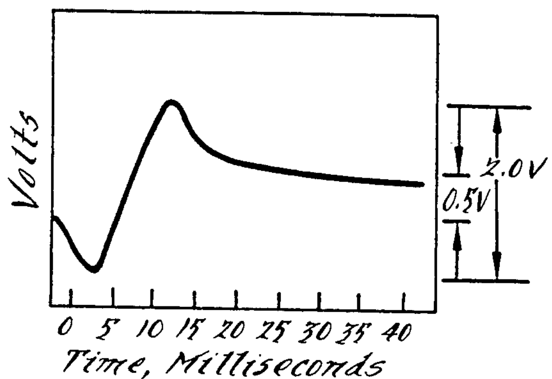

The BAPTA 16 includes a shaft angle encoder 48 which is shown schematically in FIG. 5E. The shaft angle encoder 48 generally comprises a dual coil assembly 50 mounted to the spun housing of the BAPTA and a set of eight exciter pole pieces 52 spaced apart 45° on the BAPTA despun shaft. The reluctance of the generator coil is changed as each soft iron exciter pole piece passes over a magnet in the coil assembly. This effect produces the sinusoidal electrical signal shown in FIG. 5F. The zero crossing of this sensor signal provides a clocking indicator of a relative position of the spinning and despun sections of the spacecraft 10.

The shaft angle encoder 48 provides a master platform pointing reference once per spin revolution and a high rate relative angle reference (8 times the absolute reference) to the platform pointing controller. The absolute platform pointing reference is referred to as the Master Index Pulse Reference (MIPR), and the relative angle reference is referred to as the index pulse reference (IPR). The MIPR is used by the platform pointing controller to eliminate earth line orientation ambiguities in the platform pointing direction during despin and acquisition. One of these two coil assemblies is mounted radially outboard from the other, and one of the eight exciter pole pieces is also extended radially. Thus, the outboard coil assembly is excited only once per revolution by the extended exciter pole piece, and thereby defines the MIPR.

Referring to FIG. 6A, a block diagram of a platform pointing controller 54 according to the present invention is shown. As shown in this figure, a platform pointing controller 54 is generally contained within each of the redundant ACE units 44–46. The platform pointing controller 54 is provided with five input signals. The first of these input signals is from one of the sun sensor pairs in the sun sensor assembly 36. One of the earth sensor pairs 24–26 are used to provide inputs from a north earth sensor 56 and a south earth sensor 58. The last two input signals are from the index pulse generator 38 and the Master Index Pulse Reference generator 40.

Figure 6C:
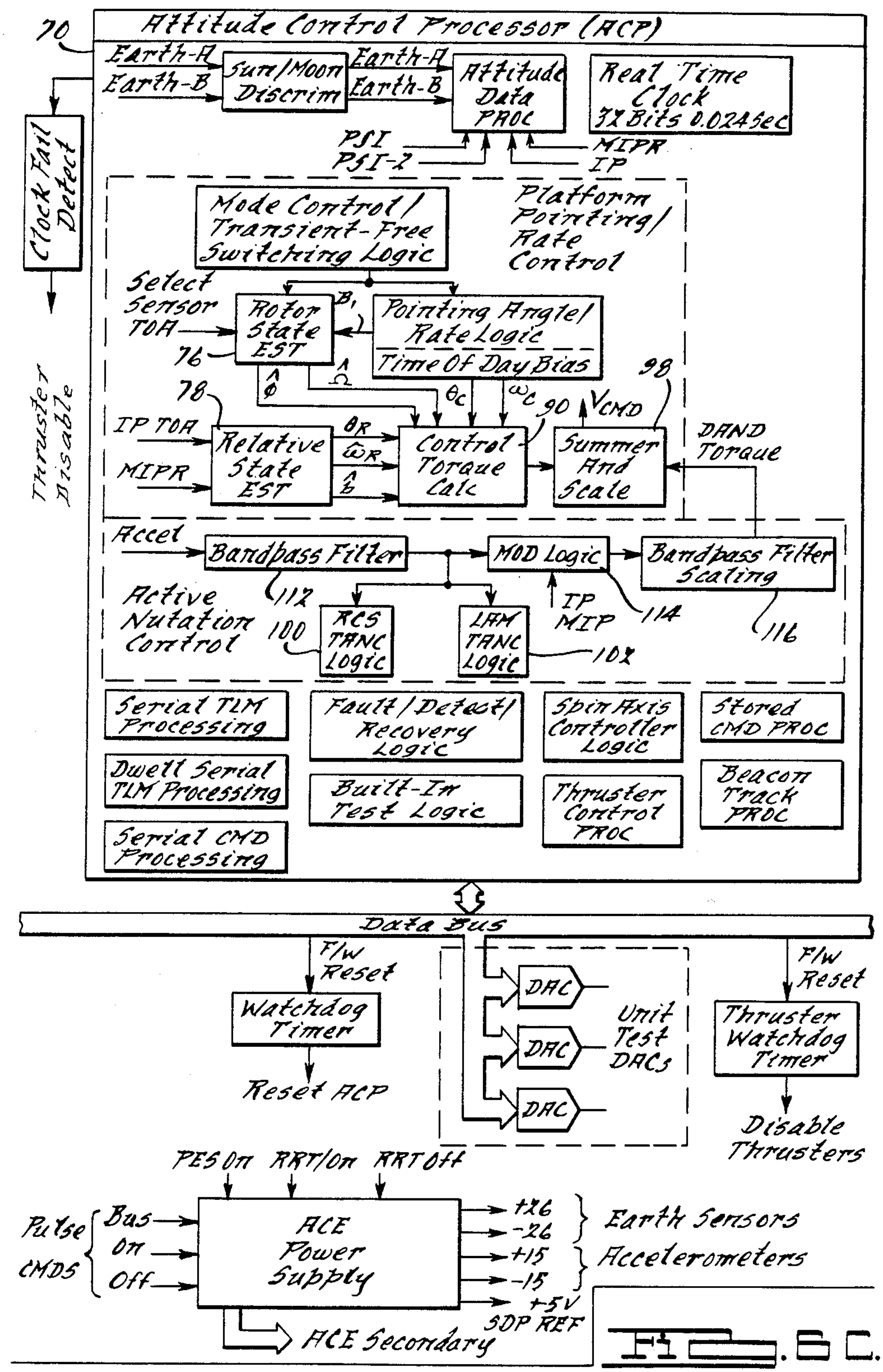

Each of these input signals are transmitted to the sensor processing electronics 60 portion of the controller 54. The sensor processing circuits 60 are used to convert the analog signals from the input sensors to suitable digital signals which can be processed by the digital processing circuitry of the controller 54. A block diagram of the sensor processing circuits 60 is shown in FIG. 6B. FIGS. 6B–6D comprise a more detailed block diagram of the precision platform pointing controller 54. Thus, for example, FIG. 6B shows the multiplexors 62 and 64 which select between the earth sensors 56 and 58 and the alternative earth sensors 66 and 68. This selection is made under computer commands from the attitude control processor 70 of the controller 54.

While the MIPR pulse signal from the Master Index Pulse Reference generator 40 is interfaced directly to the data bus 72 to the attitude control processor 70, the remaining digitized input signals are transmitted to the sensor time of arrival logic circuit 74. After being digitized, the north earth sensor 56 produces a north leading edge (NLE) signal and a north trailing edge (NTE). Similarly, the digitized signal from the south earth sensor 58 provides a south leading edge (SLE) signal and a south trailing edge (STE) signal. The sensor time of arrival logic circuit 74 will be discussed in more detail in connection with FIGS. 8–10. Suffice it to say at this point that the sensor time of arrival logic circuit 74 determines the time of arrival of each of the pulses from the sensor processing circuits 60 by using a particular time reference. Each of the time of arrival values are then transmitted to the data bus 72 of the attitude control processor. The attitude control processor 70 then stores each of these values for future platform pointing control processing.

The attitude control processor 70 includes three firmware implemented state estimators blocks 76–80. These state estimator blocks are the relative state estimator 76, the rotor state estimator 78, and the auxiliary state estimators 80. These three estimators and their associated algorithms will be described in detail in connection with FIGS. 11–14. Briefly, the rotor state estimator 78 receives digitized inertial attitude reference data (time of arrival values) from either the sun sensors or the earth sensors. The nonselected or noncontrolling inertial reference sensor provides the input to the auxiliary state estimators 80. The auxiliary state estimators 80 and the sensor switching control logic 82 combine to provide the bias correction necessary to achieve transient-free switching between the sun and earth sensors. If the sun sensor is selected as the controlling inertial attitude reference, then it is necessary to provide correction for the constantly varying sun angle during the orbiting of the spacecraft. These sun alignment corrections are provided by the firmware implemented time of day update logic 84 and the longitude and eccentricity compensation logic 86.

The rotor state estimator 78 is used to estimate the spin rate and phase of the spinning portion 12 of the spacecraft 10. The relative state estimator 76 is used to estimate the relative spin rate and phase between the spinning portion 12 and the despun portion 14 from the digitized index pulses and the digitized MIPR pulses. The relative state estimator 76 is also used to estimate the friction bias torque due to the bearings of the BAPTA 16. It should also be noted that the thruster control processing firmware 88 also provides an input to the relative state estimator 76 and the rotor state estimator 78. This input permits the platform pointing disturbances resulting from thruster firings to be minimized through the use of a feedforward torque compensation scheme to be more fully described below.

The outputs of the relative state estimator 76 and the rotor state estimator 78 are then transmitted to a summation controller 90. The summation controller 90 adds the spinning portion spin rate and phase estimates with the relative spin rate and phase estimates to produce an estimate of the despun portion spin rate and phase. The controller 90 also includes an input from the ground station which identifies the desired spin rate and phase states for the despun portion 14 of the spacecraft. The summation controller 90 then subtracts the despun portion spin rate and phase estimates and the friction bias torque estimates from the ground commanded despun portion spin rate and phase states. The output of the controller 90 is a torque command which is then transmitted to a digital to analog converter 92 for input to the motor drive electronics 94. Thus, the subtracted estimates from the controller 90 provide a suitable torque command for controlling the torque motor 96 of the BAPTA 16.

In the FIG. 6C, the summation controller 90 does not provide a direct output to the digital to analog converter 92. Rather the output of the summation controller 90 is transmitted to a summer and scale block 98 which is used to provide a modified torque command when it is desired to provide active nutational dampening through the despin controller. Thus, the summer and scale block 98 receives a despin active nutation damper (DAND) torque command from the active nutation control portion of the attitude control processor firmware. While it is possible and conventional to compensate for a nutational movement by using the spacecraft thrusters (as indicated by the blocks 100-102), the platform pointing controller 54 is also adapted to provide active nutational damping through a firmware implemented torque command.

As stated above, nutational movement of the spacecraft is sensed by the accelerometers 42. FIG. 6B shows that the output signals from the accelerometers 42 are amplified by differential buffers 104 and then passed through multiplexers 106. The multiplexers 106 determine which of the accelerometers will be telemetered to ground and which of the accelerometer outputs will be processed by the platform pointing controller 54. The controller 54 first passes the accelerometer signal through an analog band pass filter 108 to reject any D.C. offset and eliminate high frequency noise. The output of the band pass filter 108 is passed through an analog to digital converter 110 where it is then placed on the data bus 72 of the attitude control processor 70. Within the active nutation control firmware of the attitude control processor 70, a digital band pass filter 112 is provided to flatten the phase curve and remove any D.C. offset caused by the analog to digital converter 110. This filtered accelerometer signal is then passed to modulator logic block 114. The modulator logic 114 receives index pulses which provide a square wave at the relative rotor to platform rate. The square wave then modulates the filtered accelerometer signal transforming the rotor coordinate signal to plateform nutation frequency. The modulated accelerometer signal is then passed through a digital filter 116 to again remove any D.C. bias and attenuate harmonics generated by the square wave. This post modulator filter is designed to pass the sum frequency from the modulator 114. When two sinusoidal signals at different frequencies are multiplied together, the resulting signal has components at the sum and difference frequencies of the two original sinusoids. In this case, the original sinusoids are at the rotor nutation frequency and the rotor to platform relative rate. Aside from the modulation provided by modulator 114, the despin active nutation damper design is a linear system. That is, it produces a despin motor torque command proportional to the nutation angle up to a predetermined limit. The DAND torque signal is added to the despin motor torque command produced by the summation controller 90 to compensate for nutational movement of the spacecraft 10.

Referring to FIG. 7, a block diagram of the attitude control processor 70 is shown. In this particular embodiment, the attitude control processor is based on two Advanced Microdevices AM2901B four bit microcomputers and a AM2910 microprogram sequencer 120.

The instruction set designed for the ACP 70 (all single cycle instructions) includes arithmetic (add, extended add, subtract, extended subtract) and logic (and, or, exclusive or, exclusive nor, invert and) instructions that operate on any pair of the 16 internal registers of the microcomputer 118 or a memory location previously established in the memory address register (MAR) and an internal register destination for the results. Single register instructions include shifts and rotates (with and without carry), arithmetic (increment, decrement, and 2's complement), logic (invert, zero, bit test, bit set, and bit clear) operations. Program control instructions include subroutine calls, conditional jumps, conditional branches/loops, subroutine returns, and an interrupt. A special bit multiply instruction allows a single machine cycle shift, with or without adding the multiplier found in RAM, depending on bit 0 of register Q (initially the multiplicant). This instruction reduces an 8×8 multiply (read/write to RAM) to 14 machine cycles. All input/output data flows through the 16 internal registers of the arithmetic logic unit (ALU). Direct page memory access is through the lower eight internal registers.

The processor control section can be subdivided into four basic functional groups: (1) program sequencing, (2) instruction decoding, (3) data processing, and (4) data storage. The program sequence section comprises the sequencer 120, the condition code multiplexer 122, the program memory 124, and the pipeline register 126. The pipeline register 126 allows the microinstruction to be present for the entire cycle, moving the slower programmable read-only memory (PROM) 124 access from the front of the decode to the rear for more address and data bus information settling time and less overall delay in the processing path. This delay is on the order of 20 percent of the maximum machine execution path. The maximum program memory size directly accessible without paging techniques is 4K×16, but the actual size can be varied in 2K increments. For the embodiment described herein, the PROM size is 8K×16. This is accomplished by defining the lower 2K as a base page which is always attached to the sequencer with the upper 2K controlled by the contents of the program page address register (PRAR) 128.

The selected PROMs are enabled when the upper 2K is selected. The program sequencing is accomplished by the instruction sent to the sequencer 120 which contains a program counter and incrementer, a five deep stack, a loop counter/branch address register, and 16 loop/-branch subinstructions are under program control. These instructions are conditional on the outcome of data processing carry, negative, zero, always or their inverses.

The decoding portion governs the data flow on both the address and data buses. The three sources that have access to the address bus are the MAR 130, outputs of the microcomputer 118, and the lower eight bits of the pipeline register enabled when the most significant bit (MSB) is low. The sources for the data bus 72 are the microcomputer outputs enabled for output instruction and the move to memory instructions, input buffer enabled for input instructions, bit select enabled for bit manipulations instructions, and address bus enabled onto the data bus for reading MAR 130 after interrupts and moving immediate data to the internal registers. It also does the necessary multiplexing of the control bits to the ALU and the sequencer to implement the instruction set.

The data processing portion comprises the shift matrix 132 and the two AM2901Bs. The AM2901Bs contain the 16 general purpose registers (all have multiple addressable outputs), the Q register, and an ALU. The dual addressable outputs make the register to register operations possible. The Q register is used in dual register shift operations and in the execution of the multiply instructions. The ALU performs the actual arithmetic and logical operations. The AM2901Bs internal bit shifting capability, combined with the external shift matrix 132, allows for a vast combination of shift operations (including single and double register shifts) and rotates with or without carry. Shifting may be done in conjunction with both arithmetic and logical operations. The ACP 70 data memory consists of a 16 page (256 bytes/page) address register (PAR) 134, Hamming code protected (dual-detection/single-correction) RAM (1K×13) 136, constants storage 138, and a Hamming code test register 140. It will, of course, be appreciated that the present invention is not restricted to any particular microcomputer circuit design, and that the above described microcomputer circuit configuration was merely set forth for exemplary purposes.

Figure 8:
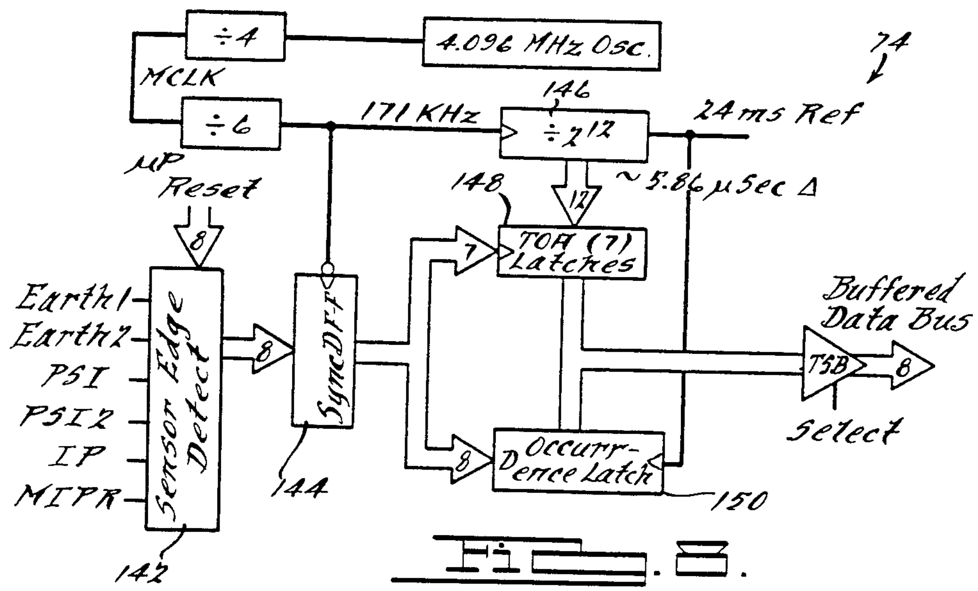
FIG. 8 is a block diagram of the time of arrival logic circuit shown in FIGS. 6A and 6B.
Figure 9:
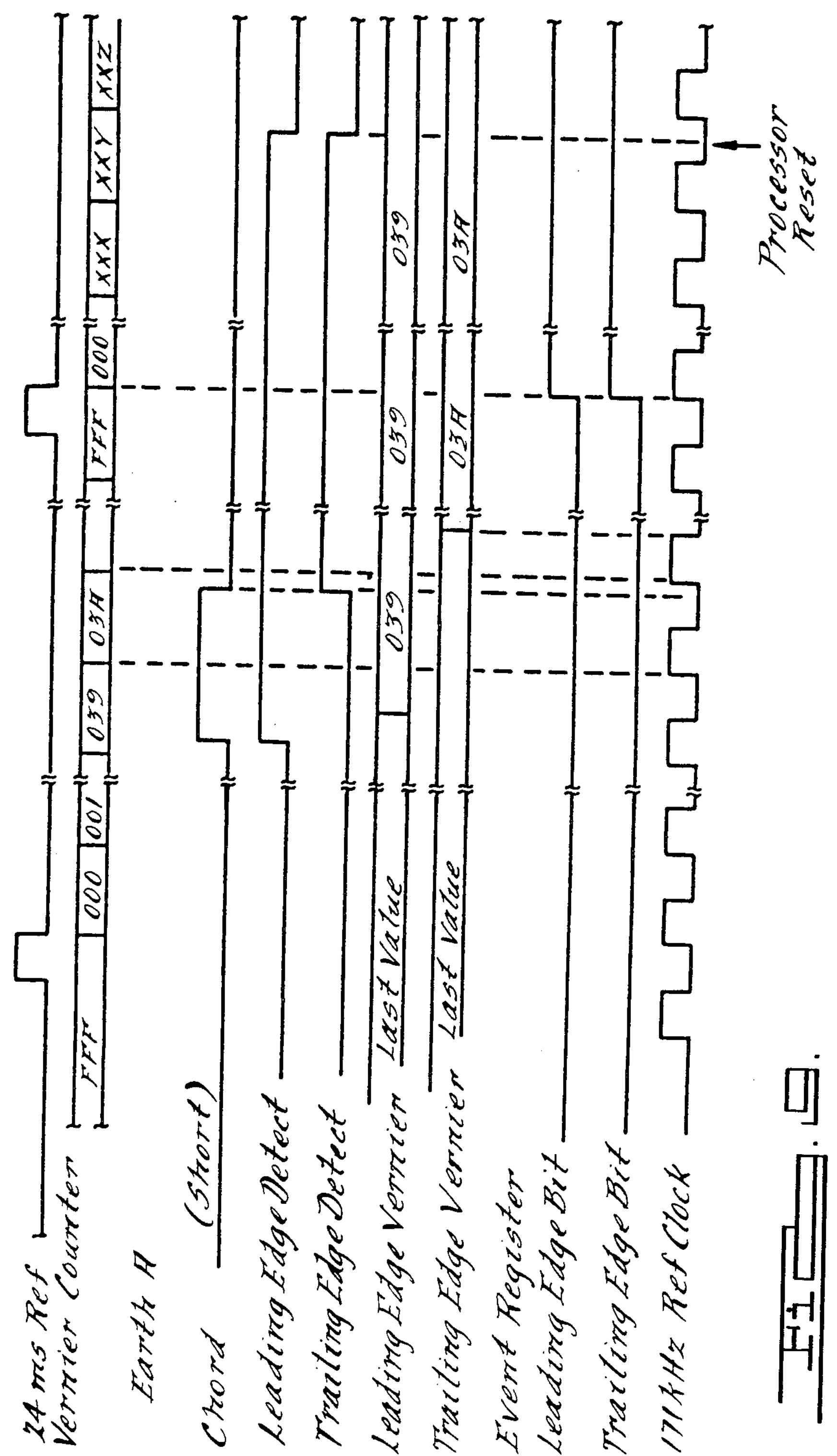
FIG. 9 is a timing diagram illustrating an example of the operation of the time of arrival logic circuit shown in FIG. 8.

Referring to FIG. 8, a block diagram of the time of arrival logic circuit 74 is shown. A timing diagram is also shown in FIG. 9 for illustrating the operation of the time of arrival logic circuit 74 of FIG. 8. The timing diagram utilizes a short earth chord A as an example for explaining the operation of the time of arrival logic circuit 74. The leading edge of the chord asynchronously sets a flip-flop in the sensor edge detect circuit 142. This signal will be synchronized by the synchronizer circuit 144 during the falling edge of the 171k Hz clock reference. The output then clocks the count of a 12 bit Vernier counter 146 into one of the tristate latches contained in the latch circuit 148. The Vernier counter 146 is updated on the rising edge of the 171k Hz clock reference, eliminating race conditions in the Vernier update versus data latching. The trailing edge of the earth chord is asynchronously loaded into another flip-flop in the sensor edge detect circuit 142, and after being synchronized, the count is latched in the same manner as the leading edge. The occurrence flags are latched into an event register 150 at the end of the 24 millisecond period.

The ACP 70 will retrieve and process the contents of the data latches 148 as required by those flags which have been set in the event register 150 during previous 24 millisecond period (eg., earth chord A, leading and trailing edges). After processing the data, the ACP 70 resets the corresponding set flags via an output command. Since the edge associated with the process sensor data is only reset and no double transitions of an edge can occur within a 48 millisecond period, all sensor processing is independent of each other.

It should be appreciated from the above, that the counter 146 acts as a Vernier to resolve event times to below the 24 millisecond real time interrupt (RTI) of the ACP 70. The 12 bit Vernier counter 146 has a resolution of 5.8594 microseconds, corresponding to an angular quantization of 0.00105° at a rotor spin rate of 30 rpm. The latched Vernier value is read by the ACP 70 in the interrupt following the occurrence of the sensor event and its value is concatenated with software timers which count at 24 millisecond real time interrupt rate to produce a precision time tag of the sensor event.

It should also be appreciated that each individual sensor event has its own independent event time logic to permit completely asynchronous occurrences of any or all sensor transition states.

Figure 10:
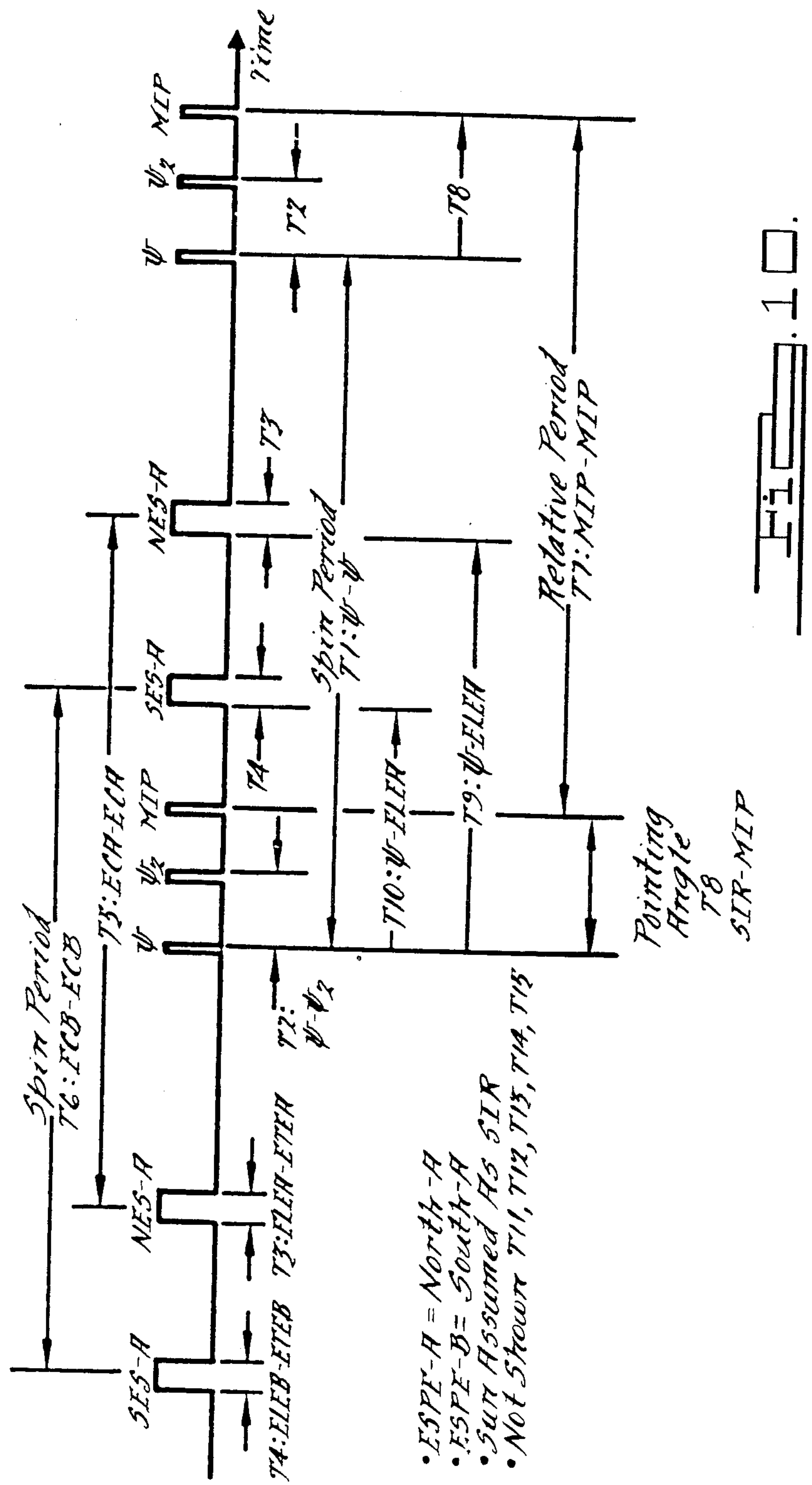
FIG. 10 is a timing diagram illustrating selected measurements made by the attitude control processor and the timing between the input signals from various sensors.

The firmware within the ACP 70 computes the 15 time interval measurements listed in Table 1 and illustrated in FIG. 10 based upon comparison of the individual sensor event time tags. The measurements are stored in data memory in three 8 bit words, giving a measurement range of $5.8594\times10^{-6}$ seconds to 98.303994 seconds with the 24 bit magnitude.

Each sensor time interval measurement is preferably telemetered once every fourth minor telemetry frame. This gives a data rate of 1.708 second, providing the ground with all sensor data recorded every spin cycle for spin rates below 35.129 rpm. Because duplicate data will be telemetered for spin rates less than 35 rpm, a new data telemetry word is provided which defines whether an individual measurement is new data (a one condition in the telemetry word) of the measurement is a repeat of previous data (a zero condition). The measurements T11, T12, and T13, which represent time intervals between sensor events and the major frame synchronization (MFS), are preferably telemetered once each major telemetry frame and have resolutions of 0.024 seconds and a dynamic range of 1572.84 seconds (16 bit magnitude).

TABLE 1

ATTITUDE DATA PROCESSOR MEASUREMENTS

| Measurement | Parameter |
|---|---|
| Time interval | |
| T1: | Sun (ψ) to sun (ψ) (spin period) |
| T2: | Sun (ψ) to canted sun ($\psi_2$) (sun aspect) |
| T3: | Chord width of earth sensor Processor A (ELE-A to ETE-A) |
| T4: | Chord width of earth sensor Processor B (ELE-B to ETE-B) |
| T5: | Spin period from earth sensor A (EC-A to EC-A) |
| T6: | Spin period from earth sensor B (EC-B to EC-B) |
| T7: | Despin index to despin index (MIP to MIP), relative period |
| T8: | Platform despin controller selected reference (earth centerline for earth reference) to despin index (MIP) |
| T9: | Sun (ψ) to leading edge of earth sensor A |
| T10: | Sun (ψ) to leading edge of earth sensor B |
| T11: | Sun (ψ) major frame synchronization |
| T12: | ELE-A to major frame synchronization |
| T13: | ELE-B to major frame synchronization |
| T14: | Sun/moon pulse (ESPE-A) |
| T15: | Sun/moon pulse (ESPE-B) |
| Rotor spin rate for data acquisition | 0.61 rpm to > to 100 rpm |
| Measurement range and resolution | 24 bits (98.304 sec) 0.00586 ms (0.00105° at 30 rpm) (24.0 ms for T11, T12, T13) (1.5 ms for T14, T15) |
| Data Rate | |
| T1 to T10 | 8 times per major frame (1.708 sec) |
| T11 to T13 | Once per major frame (13.664 sec) |
| T14 to T15 | 8 times per major frame |

Notes:
(1)Data word for NEW DATA indicator (logic 1 indicates new measurement telemetered).
(2)Out of range measurements (DT > 98.304 sec) will read 98.304 sec modulo the interval.
(3)No valid measurements for both sensor events within same RTI.
(4)Sun/moon data is set to zero for no detected pulses.
(5)Sun/moon discrimination on earth sensor data: width ≦37 ms; minimum ESPE output pulse width = 6 ms.
(6)$T_{ec} = (T_{ele} + T_{ete})/2$.

In addition to generating the normal time interval measurements, the firmware includes logic for discrimination of sun and moon pulses from earth chord width data and provides chord width telemetry of any detected moon pulse. Moon discrimination logic will reject as invalid any detected earth chord width less than or equal to 37 ms. Occurrence of an erroneous moon or sun pulse is indicated to the ground by telemetering the individual (ESPE-A and/or B) detected moon pulse width at the eight times per major frame repetition rate. If no erroneous pulse occurs, the telemetry data (8 bits each with a resolution of 1.5 ms) is set to zero. However, due to protective circuitry within each ESPE (which eliminates multiple pulse edges from being generated), the minimum digitized pulse width of any ESPE input will be 6 ms (up to a maximum of 12 ms). Thus, for a nominal moon pulse width of 0.5° (2.8 ms at 30 rpm), the detected and telemetered width will be between 6 and 12 ms.

Figure 11:
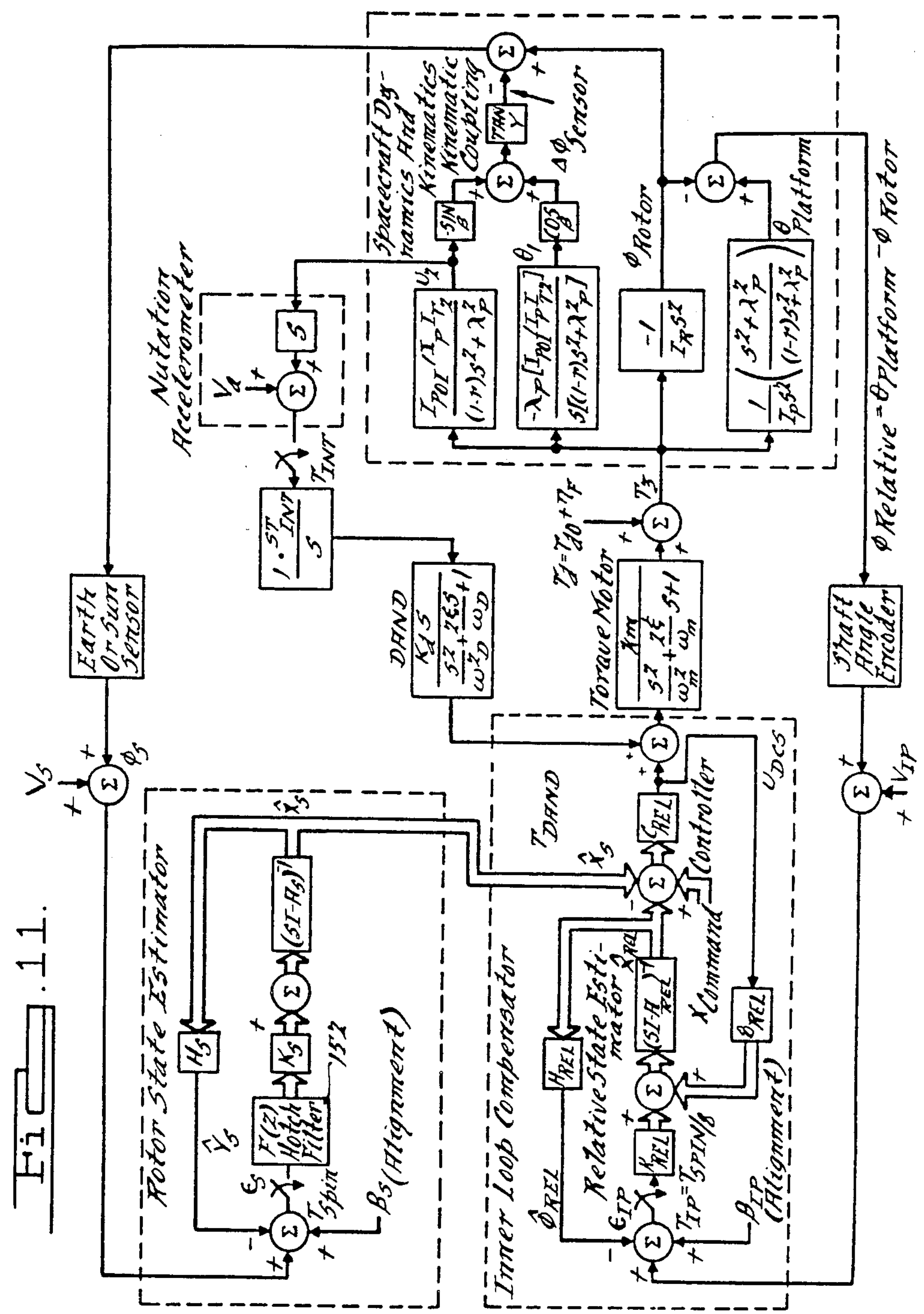
FIG. 11 is analytical model of the platform pointing controller.
Figure 13A:
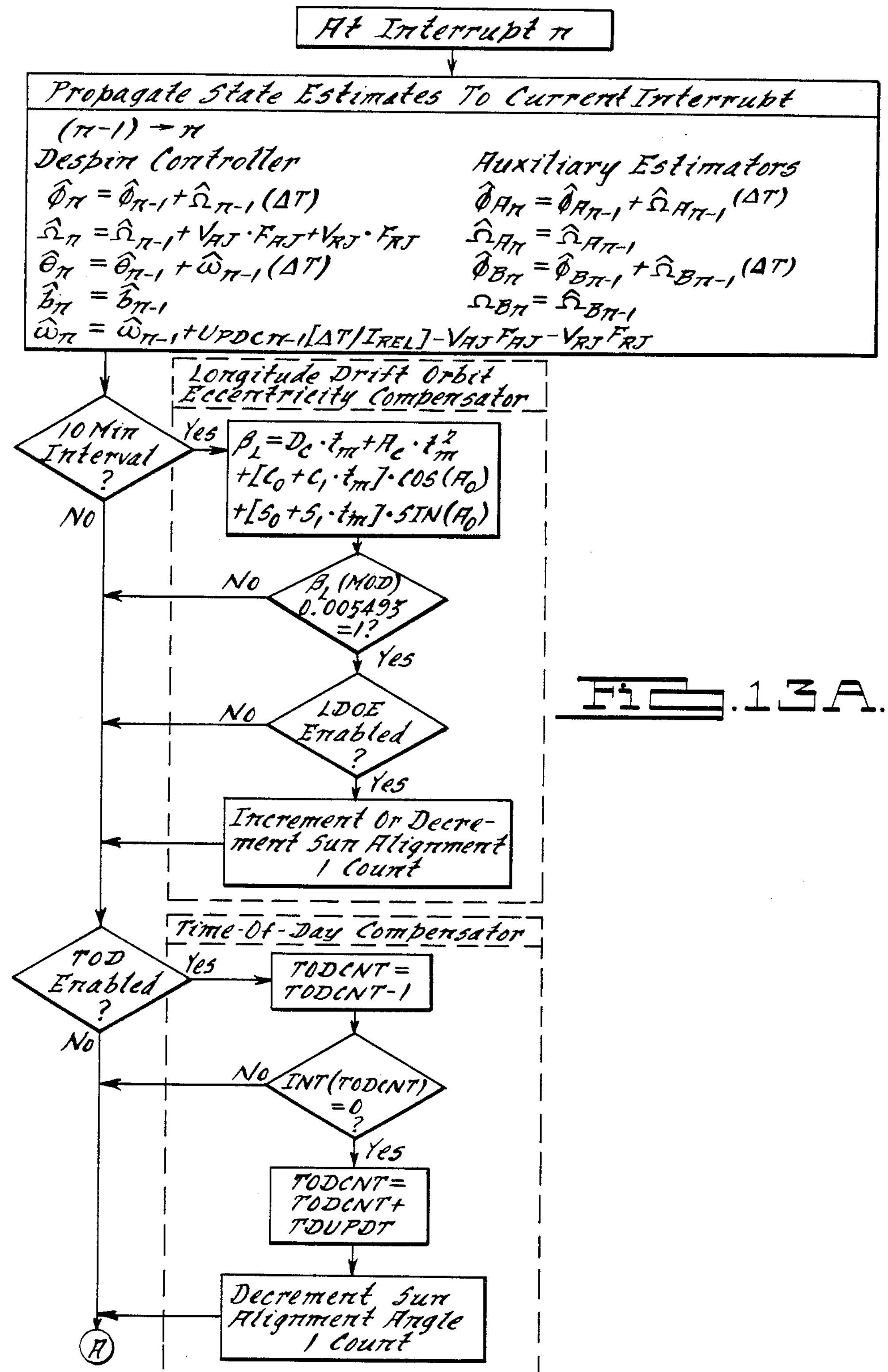
Figure 13C:
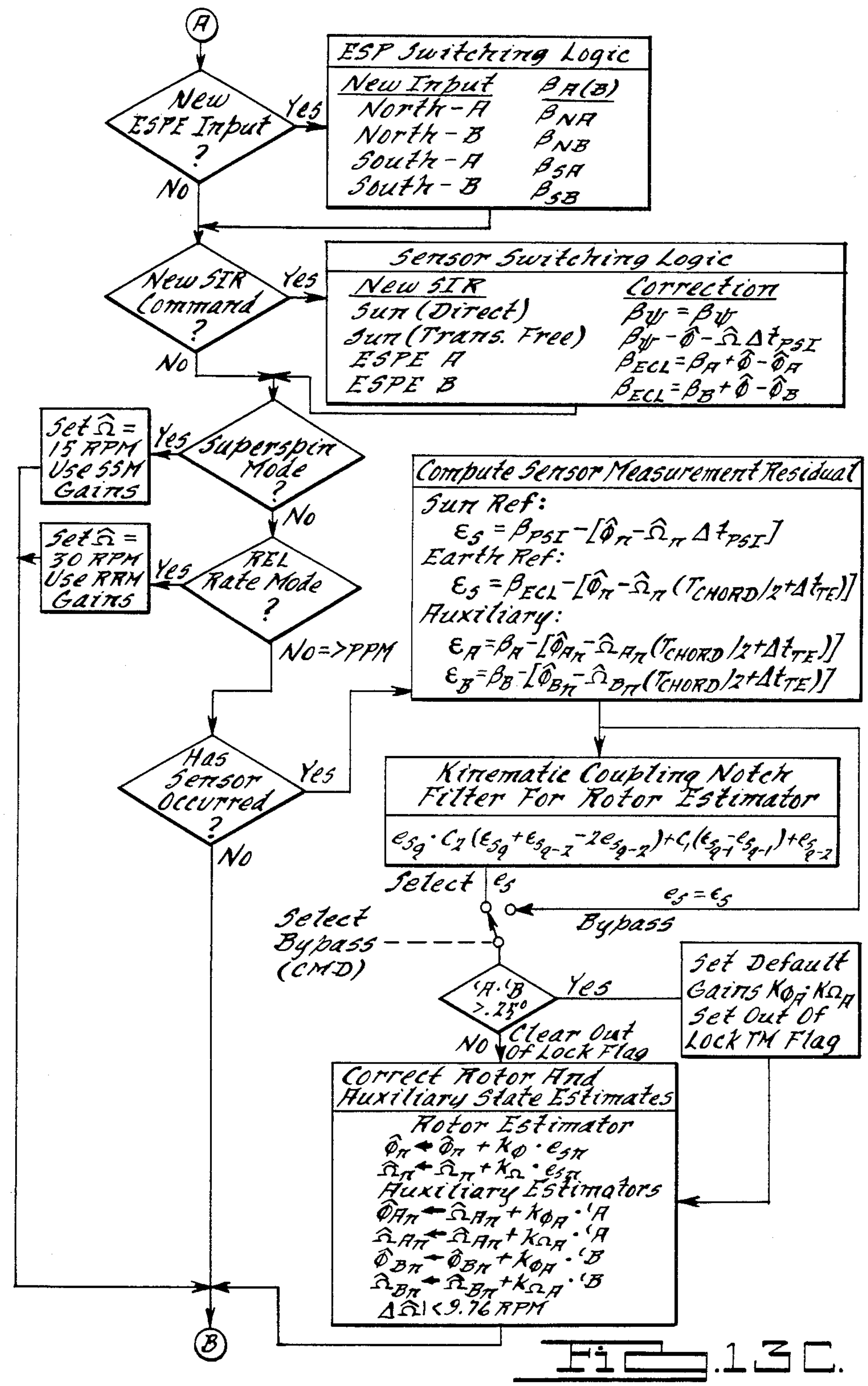
Figure 13D:
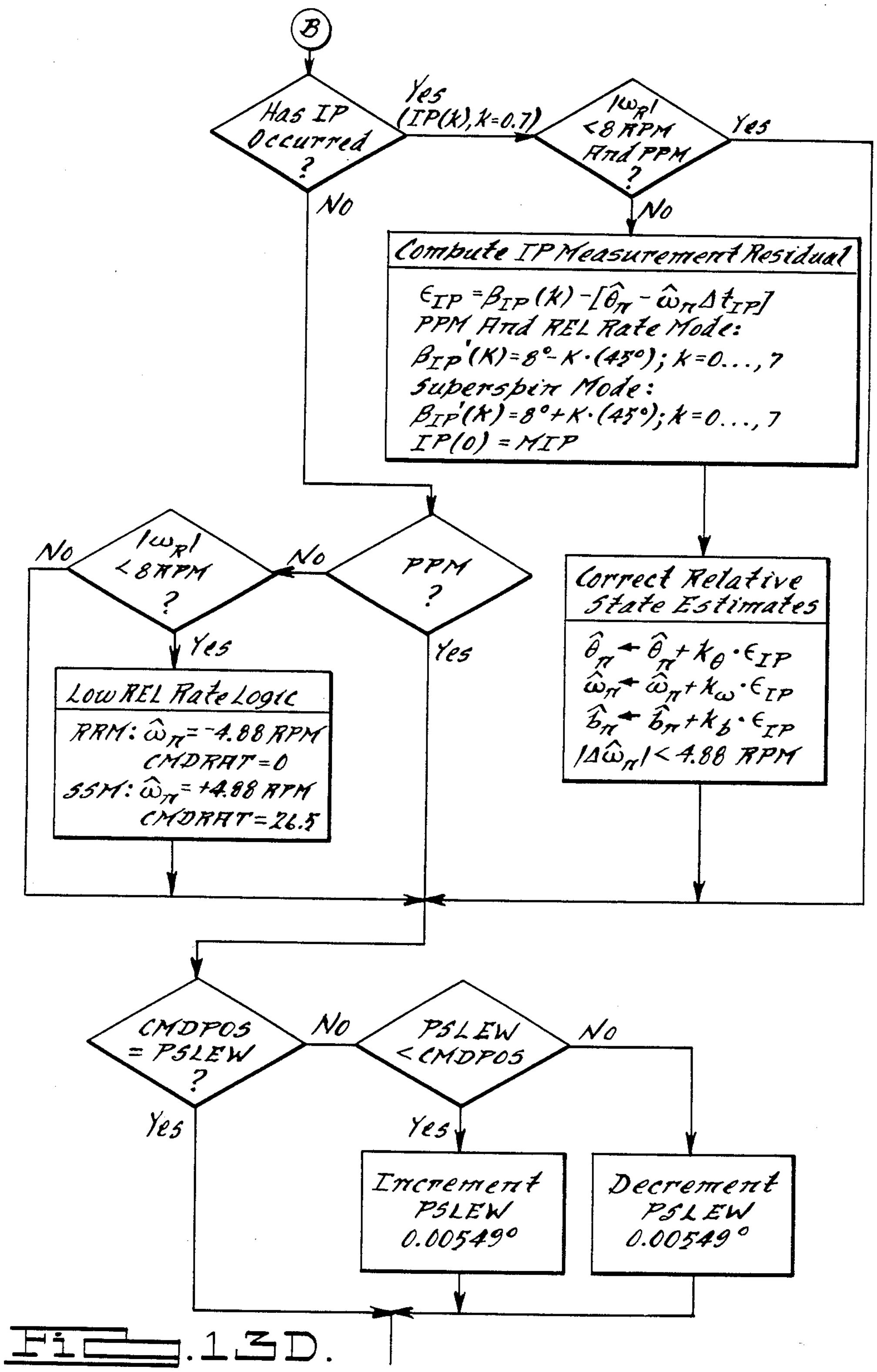
Figure 13E:
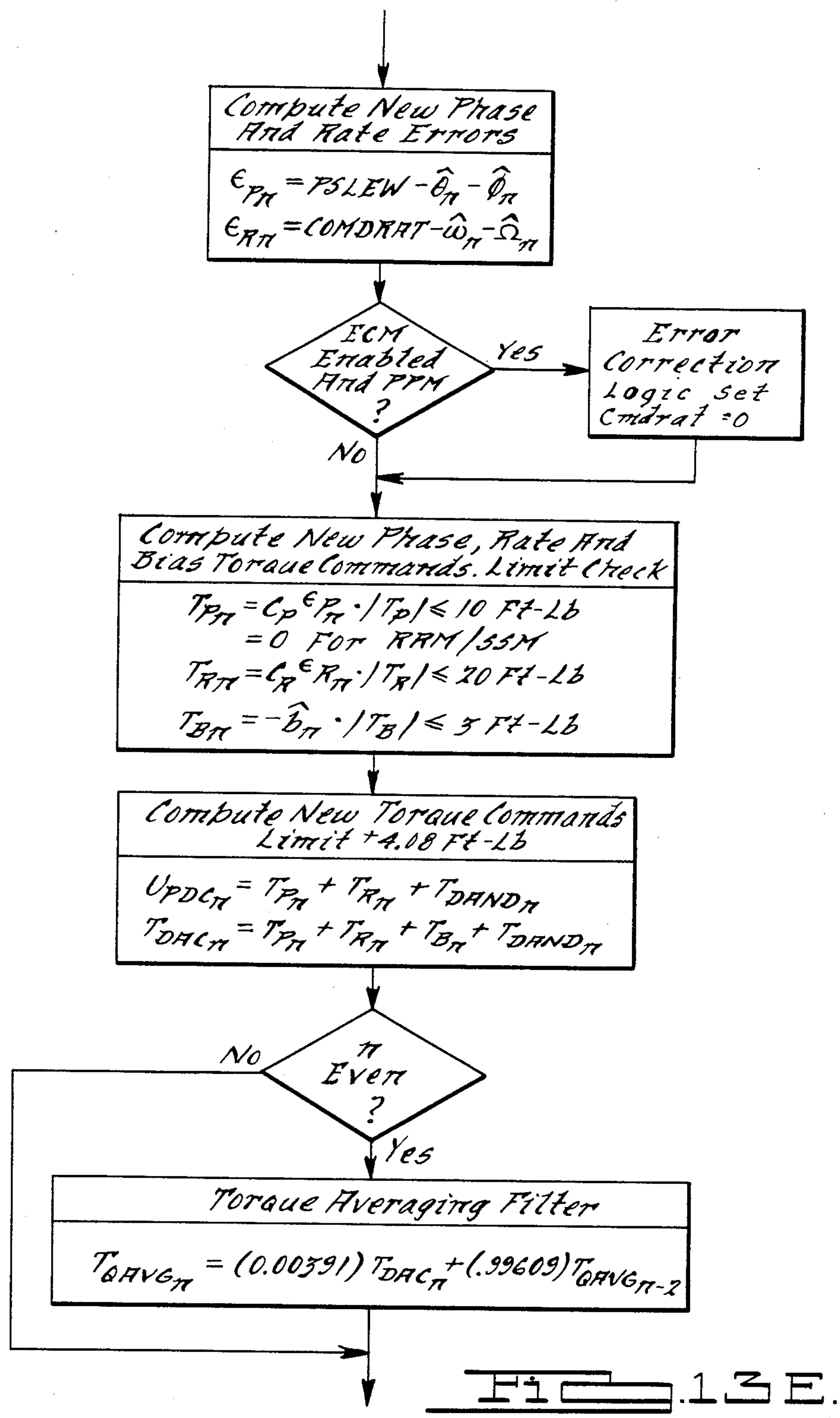

Referring to FIG. 11, an analytical model of the firmware for the platform pointing controller 54 is shown. This firmware is sometimes referred to as the platform despin control system (PDCS) firmware, and the terms used therein are defined in Table 2 below. For example, RSE is used for the rotor state estimator, and RelSE is used for the relative state estimator. The PDCS firmware is comprised of two independent subsystems: RSE (outer loop filter) and RelSE (inner loop filter). The RSE uses pulses from the inertial sensor (sun or earth) to derive estimates of the rotor phase and rate ($\phi$ and $\Omega$) This estimator is second order with an internal model of a double integrator plant (the rotor). Additionally, there is a second order difference equation on the inertial sensor measurement residuals to act as a notch filter 152 at nutation frequency to decouple the signal due to kinematic coupling in the slit sun sensor.

TABLE 2

| PLATFORM DESPIN CONTROL SYSTEM NOMENCLATURE | | |
|---|---|---|
| Basic terms | BOL | biginning of life |
| | DAND | despin active nutation damping |
| | EOL | end of life |
| | IP | index pulse |
| | PPM | platform pointing mode |
| | RPM | relative rate mode |
| | RSE | rotor state estimator |
| | RelSE | relative state estimator/controller |
| | SIR | selected inertial refernece |
| | SSM | superspin mode |
| | TANC | thruster active nutation damping |
| Dynamics | $\theta_1$ | platform (and spacecraft) transverse axis phase |
| | $\theta_2$ | platform (and spacecraft) transverse axis phase |
| | $\theta_3$, $\theta_P$ | platform spin axis phase |
| | $\phi$, $\phi_{Rotor}$ | rotor spin axis phase angle |
| | $\theta$, $\phi_{Rel}$ | relative platform to rotor spin axis phase angle, $\theta_p-\phi$ |
| | $\omega_1$ | platform (and spacecraft) transverse axis phase |
| | $\omega_2$ | platform (and spacecraft) transverse axis phase |
| | $\omega_3$, $\omega_P$ | platform spin axis rate |
| | $\omega_R$, $\omega_S$, $\Omega$ | rotor spin axis rate |
| | $I_{T1}$, $I_{T2}$ | total vehicle transverse moments of inertias |
| | $I_T$ | effective transverse moment of inertia |
| | $I_P$ | platform spin axis moment of inertia |
| | $I_R$ | rotor spin axis moment of inertia |
| | $I_{Rel}$ | relative rotor to platform spin axis moment of inertia $= I_P I_R/(I_P + I_R)$ |
| | $I_{P01}$ | platform product of inertia between spin and transverse axes |
| | r | vehicle mass properties coupling parameter $= I_{P01}^2/I_P I_T$ |
| | $\lambda_p$ | platform nutation frequency; with $\omega_p = 0$, $\lambda_p = I_R\omega_R/I_T$ |
| | $\tau_n$ | normalized nutation time constant, sec $= 2/[r\lambda_p(1 + 2\omega_p/\lambda_p)]$ |
| Torques | $T_3$ | total BAPTA torque |
| | $T_P$ | total torque applied to patform |
| | $T_R$ | total torque applied to rotor |
| | $T_{DAND}$, | DAND torque |
| | $U_{DAND}$ | |
| | $T_{PDC}$ | platform angle control torque |
| Transfer functions | $F_{S1}$ | RSE transfer function, $\phi/\phi$ |
| | $F_{P1}$ | PSE transfer function, $T_{PDC}/\gamma_P$ |
| | $F_{P2}$ | PSE transfer function, $T_{PDC}/\gamma_R$ |

TABLE 2-continued

| PLATFORM DESPIN CONTROL SYSTEM NOMENCLATURE | | |
|---|---|---|
| | $\gamma_R$ | $-\phi$ |
| | $\gamma_P$ | $-\gamma_{Rel}$ |
| | $\gamma_{Rel}$ | $\phi_{Rel} + \nu_{IP}$ |
| Error sampling rates | $T_S$ | RSE sample period = 2 sec at 30 rpm (nominal despun tracking condition) |
| | $T_{IP}$ | RelSE sample period = 0.25 sec at 30 rpm (nominal despun tracking condition) |
| | $T_{INT}$ | dynamics propagation time and DAND difference equation update period = 0.024 sec |
| Estimators | $\epsilon_S$ | inertia snesor measurement residual |
| | $\epsilon_{IP}$ | index pulse measurement residual |
| | $\beta_S$ | alignment angle for inertial reference |
| | $\beta_{PSI}$ | sun sensor alignment angle |
| | $\beta_{IP}$ | alignment angle for index pulse |
| | F(z) | notch filter transfer function |
| | $\phi$ | estimate of $\phi_{Rotor}$ |
| | $\Omega$ | estimate of $\Omega$ |
| | $\theta$ | estimate of $\theta$ |
| | $\omega$ | estimate of $\omega_{Rel} = \omega_p-\omega_s$ |
| | b | estimate of BAPTA back-EMF and friction bias torque $T_{d0}$ |
| | $X_S$ | RSE state vector $= \begin{vmatrix} \phi \\ \Omega \end{vmatrix}$ |
| | $A_S$ | RSE continuous propagation matrix $= \begin{vmatrix} 0 & 1 \\ 0 & 0 \end{vmatrix}$ |
| | | Discrete version $= \begin{vmatrix} 1 & T_S \\ 0 & 1 \end{vmatrix}$ |
| | $H_S$ | RSE output vector $= \lvert 1\ 0 \rvert$ |
| | $K_S$ | RSE gain vector $= \begin{vmatrix} K_\phi \\ K_\Omega \end{vmatrix}$ |
| | $X_{Rel}$ | RelSE state vector $= \begin{vmatrix} \theta \\ \omega \\ b \end{vmatrix}$ |
| | $A_{Rel}$ | RelSE continuous propagation matrix $= \begin{vmatrix} 0 & 1 & 0 \\ 0 & 0 & 1/I_{Rel} \\ 0 & 0 & 0 \end{vmatrix}$ |
| | | Discrete version $= \begin{vmatrix} 1 & T_{IP} & T_{IP}^2/2I_{Rel} \\ 0 & 1 & T_{IP}/I_{Rel} \\ 0 & 0 & 1 \end{vmatrix}$ |
| | $B_{Rel}$ | RelSE continuous input vector $= \begin{vmatrix} 0 \\ 1/I_{Rel} \\ 0 \end{vmatrix}$ |
| | | Discrete version $= \begin{vmatrix} T_{IP}^2/2I_{Rel} \\ T_{IP}/I_{Rel} \\ 1 \end{vmatrix}$ |
| | $H_{Rel}$ | RelSE output vector $= \lvert 1\ 0\ 0 \rvert$ |
| | $K_{Rel}$ | RelSE gain vector $= \begin{vmatrix} K_\theta \\ K_\omega \\ K_b \end{vmatrix}$ |
| | $C_{Rel}$ | Control gains vector $= \lvert C_P\ C_R\ 1 \rvert$ |
| Noise sources | $\nu_S$ | inertial sensor noise (pulse to pulse jitter) |
| | $\nu_{IP}$ | index pulse noise (pulse to pulse jitter) |

TABLE 2-continued

| PLATFORM DESPIN CONTROL SYSTEM NOMENCLATURE | | |
|---|---|---|
| | $v_a$ | accelerometer noise |
| | $T_b$, $T_d$ | BAPTA torque disturbance |
| | $T_{d0}$ | constant BAPTA torque disturbance due to friction and back-EMF |
| | $T_e^P$ | external platform disturbance torque |
| | $T_e^r$ | external rotor disturbance torque |
| | $\eta f$ | random BAPTA torque disturbance due to friction |
| Kinematic coupling | $K_C$ | kinematic crosscoupling gain = tan (γ) |
| | $K_1$ | kinematic crosscoulping gain about 1 axis = cos (β), FIG. 8-2 |
| | $K_2$ | kinematic crosscoupling gain about 2 axis = −sin (β), FIG. 8-2 |
| | γ | sun elevation angle |
| | β | sun time of day angle |
| DAND gains | $K_1$ | DAND gain about 1 axis, ft-lb/(rad/sec), FIG. 8-1 |
| | $K_2$ | DAND gain about 2 axis, ft-lb/(rad/sec), FIG. 8-1 |

The RelSE uses information from the rotor to platform index pulses to derive estimates of the relative rotor to platform phase and rate ($\theta=\theta_p-\phi$ and $\omega=\omega_p-\Omega$) along with an estimate of net BAPTA 16 back-electromotive force (EMF) and friction bias torque (b). The rotor phase and rate estimates from the RSE are added to the relative phase and rate estimates to derive inertial platform phase and rate estimates. These are compared with commanded platform phase and rate and the differences multiplied by control gains to compute a despin torque. The torque bias estimate is subtracted from this torque command to compensate for the BAPTA bias torque. The inner loop compensator implements a third order transfer function. Because the bias state models a zero frequency disturbance and is an uncontrollable mode, the inner loop compensator has an integrator.

The RSE can be viewed as a sampled data filter with an input of and an output of $\hat{\phi}$. Likewise, the RelSE can be viewed as a filter (compensator) with inputs $\theta_p-\phi$ and $\phi$ and an output of $T_{DAC}$, the despin torque command. As illustrated in FIG. 11, the system design can be accomplished by treating the two filters as separate entities.

The platform despin and pointing control (PDC) firmware design incorporates three command selectable autonomous control modes:

(1) Platform pointing mode (PPM) controls the inertial azimuth platform angle and rate. However, if a nonzero rate is commanded, the torque component due to pointing angle error is set to zero and the PDC controls only the inertial platform rate.

(2) Relative rate mode (RRM) controls the relative platform to rotor rate to a commandable value when the rotor spin rate is greater than the platform spin rate.

(3) Superspin mode (SSM) controls the relative platform to rotor rate to a commandable value when the rotor spin rate is less than the platform spin rate.

The logic flow diagram of the algorithm used by the ACP firmware to implement platform despin control is shown in FIGS. 13A–13E. The control loop is implemented using a state estimator and controller approach. The state estimates for rotor inertial rate and phase, platform relative rate and phase, and BAPTA friction bias are propagated every real time interrupt period of the ACP (24 ms); and a torque command is calculated in order to produce a nearly continuous control signal and reduce steady state jitter. Corrections to the state variable estimates occur at the RTI after a sensor occurrence has been detected by the ADP. For an earth sensor reference, the correction is not made until after an earth trailing edge has occurred.

Propagation of the estimates uses the torque calculated during the previous RTI and the previous states in a fifth order spacecraft model. Terms are also included in both the rotor and relative rate propagations to account for the high speed spin rate changes which can occur as a result of axial or radial thruster firings. If a phase propagation were not updated for one RTI at 30 rpm, the resultant phase error at the next correction for rotor and relative phase would be 4.32° which, in turn, would cause a large pointing transient. To protect against this condition, the phase propagation equations are executed in a protected part of the firmware at the beginning of each RTI while all interrupts are disabled.

Two additional rotor phase and rate estimates (referred to as the auxiliary estimates) are formed using the sensor inputs from ESPE-A and ESPE-B. These phase angles are used to achieve transient-free switching to and between earth sensor references. Since these estimates are not primary, the compensation terms for thruster firings are not included in the propagation equations.

For rotor state variable corrections the estimated phase of the rotor is calculated back to the TOA of the sensor and compared against a reference phase angle. Values for the nominal reference angle of each earth sensor are stored in the data programmable read-only memory (PROM) 138 and are used as the reference for the auxiliary estimators whenever that sensor is selected for either ESPE-A or ESPE-B. When an earth reference is commanded, the reference phase angle for the primary rotor state estimator is corrected from the PROM value by the error between the current and auxiliary rotor phases. The earth reference phase angle may also be set by ground command.

When in the sun reference mode, the rotor phase estimator will track the sunline if given a constant reference phase. The constantly changing sun-earth separation angle (nominally 360° per 24 hours, the mean earth rate) requires that the sun reference phase angle be updated periodically to maintain a constant earth pointing angle. Time of day (TOD) corrections may be enabled or disabled by ground command. If enabled, the sun reference angle will be updated by one least significant bit (0.00549°) every ground specified interval. This update will occur whether or not the sun is being used as the reference for the rotor state estimator. A separate correction factor is used to account for longitudinal dirft and orbit eccentricity (LDOE) effects on the sun-earth separation angle. The correction angle is a complex function of time and orbit angle whose coefficients are ground commandable. If the LDOE is disabled, the correction angle function will continue to be updated, but the corrections to the sun reference angle will not be made. The LDOE is similar to the TOD function in that corrections to the sun reference angle will be made regardless of whether it is used for rotor state estimation. The sun reference angle may also be set by ground command.

Rotor state estimate correction is bypassed if either RRM or SSM is selected. If PPM is selected, the error between the reference and estimated phase angles is used to correct both the rotor phase and rate estimates. It is possible to select a filter error that has been passed through the digital notch filter 152 to remove the contribution due to kinematic nutation coupling. The notch frequency of this filter may be adjusted using ground commands to set the two difference equation coefficients. Two selectable sets of rotor estimator gains allow for the use of different gains while in earth or sun reference. In addition, sun, earth, and auxiliary estimator gains may be independently selected to be their default values or ground (or processor) specified alternate gains. Processor specified alternate gains are used during the error correction mode.

Relative state estimate corrections are generated at each index pulse occurrence by comparing the estimated phase to a reference phase. This reference phase is reset to $-8°$ at every MIP occurrence. It is then incremented (in SSM) or decremented (RRM or PPM) by 45° every index pulse (IP) thereafter. Since this update is important to estimating the relative phase correctly, it is performed in the protected despin region along with the phase propagations. The error generated at each IP occurrence is used to correct the estimates for relative rate and phase and BAPTA bias friction torque. The gains used may be selected to be default or ground or processor automatically whenever either RRM or SSM is commanded.

During superspin and despin transitions, the relative rate will go through a region of low relative rates ($<8$ rpm). Since the index pulse generators will not operate consistently at very low relative rates, firmware has been added which detects relative rates below 8 rpm in RRM and SSM and sets the relative rate estimate and the commanded rate, so that the correct saturated torque is generated to drive the spacecraft through this region.

The BAPTA torque command is generated by comparing the ground or processor specified angle and rate commands against the estimated inertial platform angle and rate which are formed using the rotor and relative state estimates. The commanded angle position may be up to $\pm 180°$. If a new angle command is input, the reference command to which the estimated angle is compared is incremented or decremented (whichever the processor determines is closer to the command) from its present value by one least significant bit (0.00549°) every RTI until it matches the input command. This process creates an effective slew rate limit of 0.23 deg/sec for a change in platform position. The error in angle is computed only when PPM is commanded and the commanded rate is zero; otherwise, it is not updated and the contribution to torque is zeroed.

Operating in RRM or SSM the rotor rate estimate is held fixed. The relative rate is then controlled to the commanded rate minus the set rotor rate estimate ($\hat{\Omega}$). For RRM, $\hat{\Omega}$ is set to 30 rpm, and for SSM $\hat{\Omega}$ is set to 15 rpm.

In PPM before the torque is calculated, an error correction mode (ECM) algorithm can be enabled. The ECM provides protection against cosmic ray induced disturbances to computer hardware, and is designed to disable the calculated torque output if the error in platform angle is greater than 0.2°. Instead, an average torque is output for a 10 second interval, and high gains are used in the rotor state estimator to decrease the time needed for it to lock to the correct rotor phase. Default gains are used for the relative state estimators. The rotor default gains are used after the 10 second safe-hold period. The error correction function cannot be used again until 30 second after the error in angle has returned to within 0.2°. This safeguard prevents any extraneous triggering of safe-hold which could arise from a small transient created by the resumption of closed loop control.

Normal torque computation is calculated as a limited sum of the rate and angle errors multiplied by their respective gains. These gains have default and alternate commandable values. The torque calculated by the despin active nutation damper algorithm is then added, and this sum is used as the feedback to the rate propagation equations. This result is also output to the digital-to-analog converter (DAC) 92 whose signal serves as the command to the motor driver electronics 94.

In accordance with one embodiment, the superspin rate mode will be used during apogee motor firing (AMF) to ensure that the effective inertia ratio of the rotor is maintained greater than unity ($\sim 1.4$) so that energy dissipation in the liquid fuel tanks will be stabilizing. Superspin is defined as a state in which the platform rotates in the same direction as and faster than the rotor. In this case the platform to rotor relative rate is actually in the opposite direction as the normal despun relative rate. Since the relative state estimator has no knowledge from the index pulses as to the direction the relative rate, it will always produce a negative relative rate estimate unless told to do otherwise. Selection is made at power turnon if the despin mode latching relay was set to the superspin state. It can also be made by ground command selection of SSM in the despin mode command. This command causes an inversion of the sign of the loop feedback so that the estimated relative rate will be positive rather than the negative value generated in RRM or PPM. The desired relative rate is then achieved by sending an appropriate PDC rate command (CMDRAT). Since the rotor rate estimate is fixed at 15 rpm in superspin and the relative state estimator is generating a positive estimate, the commanded rate should be $$\text{CMDRAT} = \text{abs (desired relative rate)} + 15 \text{ rpm}$$

The value for the commanded rate which is input automatically at power turnon (if the latching relay was set to superspin) and during low relative rates is 26.5 rpm. This commanded rate will control the spacecraft to a superspun relative rate of 11.5 rpm; i.e., the platform will spin 11.5 rpm faster than the rotor.

To superspin from the all spun condition, the superspin mode command should be sent (or the ACE should have been turned on with the latching relay in superspin). Since no index pulses are generated in the allspun condition, the low relative rate logic will then set the commanded rate to 26.5 rpm and the estimated relative rate to +4.88 rpm. This command will generate a full scale torque command with the correct sign (positive) to superspin the platform. When the relative rate reaches 8 rpm, normal relative state estimation begins automatically and a ground selected CMDRAT can be sent.

At the beginning of apogee motor firing, the rotor will be spinning at 12 rpm and the platform at 23.5 rpm, giving a relative rate with an absolute value of 11.5 rpm. During the burn these rates are maintained by the commanded rate of 26.5 rpm and by adjusting the momentum using the spinup/spindown thrusters as needed. In the event of a failure which triggers the relative rate logic, control would be passed to the second ACE which would turn on in the SSM condition with a commanded rate of 26.5 rpm provided that the latching relay had been set to the superspin state.

The platform despin maneuver following AMF is begun from the superspun condition. The relative rate will pass through zero and change direction during the maneuver. The despin maneuver is initiated by commanding RRM, which changes the sign of the relative state estimate and sets the rotor state estimate to 30 rpm, and by sending a commanded relative rate of zero. This command will cause a torque in the correct direction (negative) to despin the platform. While the absolute relative rate is less than 8 rpm, the low relative rate logic will set the relative rate estimate to −4.88 rpm and the commanded rate to zero to ensure the correct torque through this region. When the relative rate has passed through zero and risen above 8 rpm again, normal relative state estimation is resumed automatically and a new commanded rate may be ground selected. The value for the commanded rate is calculated as $$CMDRAT = -\text{abs (desired relative rate)} + 30 \text{ rpm}$$

For a nominal rotor spin rate of 30 rpm (on-orbit platform despun), the commanded rate should be set to zero. If the relative rate toggle logic is triggered while the latching relay is in the normal spin condition, the second ACE will turn on with the relative state estimator generating a negative rate estimate, the rotor spin rate estimate ($\hat{\Omega}$) set to 30 rpm, and the commanded rate set to zero, thus generating a torque command which will control the spacecraft relative rate to 30 rpm.

Platform pointing mode may be used to control both the platform inertial rate and the offset pointing of the platform boresight. Direct control of the platform inertial rate can be achieved by commanding a nonzero platform rate. Normal operation of the rotor state estimator continues, providing an inertial reference; thus, the inertial platform rate (rather than the relative rate) will be controlled to the commanded value. In this mode, the torque component due to platform angle error is zeroed. A rotor spin rate greater than 21 rpm is generally required for PPM operation.

Offset pointing of the platform boresight is accomplished via serial command to the PDC to control the state estimate to a ground commanded value (CMDPOS). The offset command range is ±180° with a command resolution of 0.00549°.

The PDC has been designed to accommodate several control modes throughout the life of the spacecraft (see Table 3); therefore, it has several ground selectable modes and parameters. The top two bits of the PDC mode command determine whether RRM, SSM, or PPM is commanded. If RRM or SSM is commanded from PPM, alternate gains will be set and selected for use in the relative state estimator and the torque computation. Otherwise, the default/alternate gains will be set according to the ground command or the ACE initialization. The next bits control the enable/disable of the notch filter output and the enable/disable of the error correction mode.

TABLE 3

ADCS DESPIN CONTROL MODES

| Mode | Operation | Function |
|---|---|---|
| Platform pointing | | |
| Sun pointing | Automatic despin, acquisition, and tracking of sun; time of day correction for earth tracking; automatic drift/eccentricity compensation | Normal on-station platform pointing |
| Earth pointing | Automatic despin, acquisition and tracking of earth centerline; command selection of one four earth sensors | Eclipse period platform pointing |
| Relative rate control (superspin) | Maintenance of fixed platform/rotor relative rate; rate bias by command; nominal RRM rate - 30 rpm; negative relative rate control for transfer orbit superspin | Transfer orbit operations; apogee boost; on-station failure recovery |
| Ground torque | Setting of motor torque by ground serial command; normal despin control loop bypassed | Failure mode; backup for manual platform pointing control |
| Initialization | Deactivation of thruster functions, enabling of relative rate mode, activation of despin, active nutation control function | Establish a safe-hold state at ACE power on |

A group of five bits controls the default/alternate parameter selection for the estimator/controller gains. The status of these bits in the command will be ignored unless a field enable bit is also sent. This enable bit allows the ground to send a new mode command (such as ECM enable) without changing the status of the gain selection. Independent default/alternate gain selections may be made for the following groups of gains: (1) Torque gains ($C_R$ and $C_p$)—Multiply the inertial platform rate and pointing angle errors to form torque components. (2) Sun Rotor Gains ($K_\Omega$ and $K_\phi$)—Multiply the rotor phase error to form rotor rate and phase estimate corrections when the sun is used as reference. (3) Earth Rotor Gains ($K_\Omega$ and $K_\phi$)—Multiply the rotor phase error to form rotor rate and phase estimate corrections when an earth sensor processor is used as reference. (4) Relative Gains ($K_\omega$, $K_\theta$, and $K_b$)—Multiply the relative phase error to form relative rate and phase estimate corrections and BAPTA bias friction estimate corrections. (5) Auxiliary Gains ($K_{\Omega A}$ and $K_{\phi B}$)—Multiply the rotor phase errors generated by the auxiliary estimates to form rate and phase corrections to the auxiliary estimates.

Referring to FIG. 12A, the rotor state estimator (RSE) is shown to be a second order state estimator which uses an internal model of the rotor dynamics to operate on the ground selected inertial reference (earth or sun sensor) pulses to general estimates of the inertial rotor spin phase and rate. The RSE operates by measuring the difference between the estimated and measured rotor phase at the receipt of each inertial reference pulse and correcting the phase and rate estimates by an amount proportional to this difference.

The RSE is a linear system; expressions can therefore be derived for open and closed loop transfer functions, transmission of white pulse to pulse sensor noise through the system, and the response of the RSE to a rotor torque disturbance. The rotor state estimate is propagated nearly continuously with respect to the sensor sample rate. The phase and rate estimates are propagated at every real time interrupt, a period of 0.024 second.

The RSE error at any sensor pulse is the difference between the reference and estimated rotor phase at the time of arrival of the sensor pulse. However, the sensor pulse (sun sensor pulse or earth sensor trailing edge detection) may occur at any time during an interrupt period, but will not be detected by the firmware until the following interrupt. At the interrupt, therefore, the estimated rotor phase at the sensor pulse TOA is computed by propagating the phase estimate backwards in time to the TOA. If the inertial reference is an earth sensor, the phase estimate is propagated back to the earth centerline, which is computed by averaging the TOA of the earth leading and trailing edges. This procedure is called "earth centerfinding" and reduces the sensor pulse to pulse jitter by a factor of $1/\sqrt{2}$ because both leading and trailing edge information is used.

When radial or axial thrusters are fired, a large spin-axis torque can be applied to the rotor. This torque causes the motor to accelerate positively or negatively. In either case, the rotor phase estimate will have an error proportional to the acceleration. This error can be reduced by using apriori knowledge of thruster firings to adjust directly the rotor rate estimate. $V_{AJ}$ and $V_{RJ}$ are commandable parameters which represent the rotor rate change between two real time interrupts due, respectively, to axial and radial thruster firings. Thus, as long as any thruster is fired, $V_{AJ}$ or $V_{RJ}$ is added to the rotor phase estimate at each real time interrupt. This procedure causes a substantial reduction in the rotor phase estimate error due to firing of thrusters.

The rotor state estimator, which receives phase information only once every spin cycle, can estimate a spin rate exactly twice the actual spin rate without generating any phase errors. For a nominal on-station rotor spin rate of 30 rpm, the estimator could return either 30 or 60 rpm as a spin rate and generate no errors to correct itself. In order to prevent this, two steps are taken:

(1) Rate variables are limited to the range between 20 rpm and 45 rpm.

(2) Corrections made to the rotor rate estimate are limited to a magnitude of 9.76 rpm.

The limiting of the rate correction prevents a mode in which the estimator is alternately trying to correct to the actual spin rate and twice the actual spin rate. These limits do not affect normal state estimation adversely and will only be observed during RSE response to an extreme transient.

The rotor state estimator has two sets of gains which may be independently specified. One is used when the sun is used as a reference (sun mode), and the other when the earth sensor processor output is selected as the reference (earth mode). The pulse to pulse jitter of the earth sensor is much larger than that of the sun sensor. The only thruster maneuver performed in earth mode is the rather benign attitude trim. Therefore, when using an earth sensor as the inertial reference, low estimator gains may be commanded in the RSE, which lowers the bandwidth and attenuates high frequency sensor jitter, at the cost of some tracking performance.

The sun sensor pulse to pulse jitter is almost nil, with all major thruster maneuvers performed in sun mode. Most of the maneuver generated error is removed by feeding forward the thruster fire commands to the RSE; however, a fairly high bandwidth RSE is necessary to maintain a small residual error. A larger phase gain $K_\phi$ will tend to make the estimator more stable; a larger rate gain $K_\Omega$ causes the estimator to track rotor acceleration more effectively but reduces the stability margin of the RSE. A smaller value of $K_\Omega$ makes it possible to include a wider notch filter without destabilizing the closed loop estimator.

The constantly changing sun-earth angle requires a time varying pointing bias correction to maintain platform earth pointing while operating in a sun reference mode (in which the RSE tracks the sunline). This function, denoted the time of day (TOD) compensator, is incorporated into the PDC firmware module. When enabled by command, the TOD generates adjustments to the RSE sun alignment angle ($\beta_\psi$) at a constant rate to compensate for the changing sun azimuth. Two effects combine to determine the required compensation: time of day and equation of time.

The principal effect which must be compensated by the TOD function is the fundamental daily motion of the sun as observed by the spacecraft. This 360° phase change of the sun over a solar day defines the mean earth rate of 15.0 deg/hour. The period of the sun sensor output pulses is slightly less than once per rotor revolution because the sun is rotating around the satellite in the opposite direction of the rotor spin. Thus, the rotor period measured by the sun sensor is less than the true rotational period. If left uncorrected, this measurement of rotor phase will cause the despun platform to rotate once per solar day. Because the sun is rotating at a mean solar rate of 0.25068 deg/min, the sun sensor outputs a pulse every 1.9999536 seconds at a rotor spin rate of 30 rpm (2.0 second spin period). This rate corresponds to a rotor phase error of 0.00835° at every sensor event.

Two additional sun motion effects affect sun referenced pointing performance. The first is caused by the inclination of the earth's axis into the earth-sun orbit phase. The second is caused by the eccentric orbit of the earth about the sun.

As a result of orbit eccentricity, the sun appears to move to the right, then reverse itself to move to the left, then back again to the right. The sun appears to oscillate in the horizontal orbit plane with an amplitude of 1.8° over a period of 1 year. As the earth travels closer to the sun, its velocity increases because its potential energy is being traded as an increase in kinetic energy. The ADSC sees this increase velocity as a movement of the sun to the left. A decrease in velocity (the earth-sun distance increasing) moves the sun to the right. The sun movement appears to reverse itself twice per year, because the earth approaches the sun twice during its orbit. The net effect of this periodic angular movement of the sun is a false sun sensor measurement of rotor period. If left uncompensated, this false rotor period will cause the observer platform to servo to the sun's movement. An eccentric orbit results in a platform pointing error of the form 1.8 sine (L+13.4) degrees, where L is the sun longitude angle.

Because of earth axis tilt (inclination or obliquity of the ecliptic), the sun travels above the earth spin plane, then travels below the earth spin plane over a year. The earth spin plane is tilted away from the earth-sun orbit plane by the inclination angle. The maximum position of the sun above the orbit plane is called summer solstice and below, winter solstice. The position of the sun when it crosses the earth's orbit plane from below is called vernal equinox, whereas from above, it is called autumnal equinox.

The equation of time (EOT) effect describes the combined effects or orbit eccentricity and inclination over a year. A first order approximation describing the difference between the true and mean solar angles is given by $$E=s-\alpha=L-\alpha$$

$$E=(\theta-\alpha)-(\theta-L=(\theta-\alpha)-(V-M)$$

$$E=\approx 0.427 \sin(L)-1.79 \cos(L)+2.49 \sin(2L) \text{ (deg)}$$

where s=right ascension of mean sun=L $\alpha$=right ascension of sun $\theta$=true longitude of sun L=mean longitude of the sun measured in the ecliptic plane V=true anomaly of the sun M=mean anomaly of the sun This angle (E) represents the platform pointing error resulting from a constant (mean earth rate) TOD correction interval if no other pointing corrections were made. This function is based on the geometry of FIG. 14A. The cosine (L) and sine (L) terms are dominated by orbit eccentricity, while the sin (2L) term is dominated by orbit inclination.

Figure 14A:
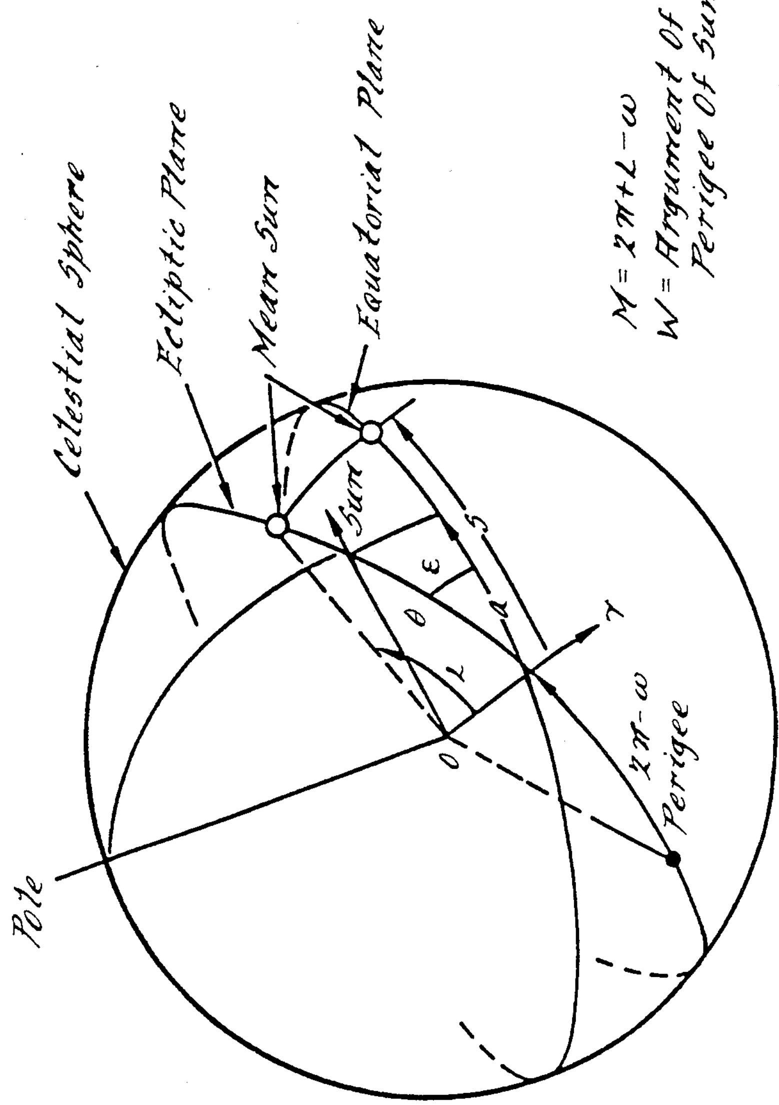
FIG. 14A is a diagram illustrating the geometry relating the mean sun and the true sun position.
Figure 14B:
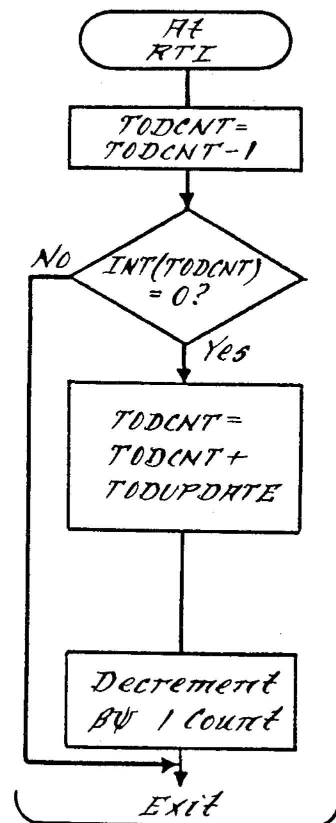
FIG. 14B is a flow diagram which illustrates the time of day compensation algorithm.

To accommodate a variable TOD rate, the TOD algorithm in the firmware generates corrections to the RSE sun alignment angle ($\beta_\psi$) at a rate set by ground command. The TOD function algorithm is illustrated in FIG. 14B. In the algorithm $\beta_\psi$ is decremented by 1 LSB ($0.00549°=360°/2^{16}$) every $T_{TOD}$ seconds giving a compensation rate $$w_c = \frac{360/2^{16}}{T_{TOD}} \text{ (deg/sec)}$$

where $T_{TOD}$=1.3147598 seconds for the nominal TOD correction

The update period is adjustable by command with a resolution ($\Delta T_{TOD}$) of 23.4375 μsec.

Additional boresight pointing errors will develop when using the sun as an inertial reference to maintain earth center tracking as a result of residual orbit eccentricity, variations in the spacecraft longitudinal position, and solar parallax. To maintain precise earth pointing while operating in sun reference mode an automatic, onboard, programmable compensation algorithm (the LDOE) is incorporated into the PDC firmware processing. The LDOE compensator generates a second time varying correction to the sun alignment angle ($\beta_\psi$) used in the RSE algorithm.

For a geostationary satellite at a nominal longitude $L_s$ (degrees+W), designed to track the nominal subsatellite point (at $L_s$), tracking errors will occur in a sun referenced platform control mode caused by long term drift in spacecraft longitude and residual orbit eccentricity. Synchronous orbit longitudinal acceleration, $a_\lambda$, is given by $$a_\lambda=6.95 \sin 2(\lambda-\lambda_o), \text{ fps/year}$$

where $\lambda-\lambda_o$=satellite location relative to a stable mode (76±6°E, 106±6°W)

The longitude shift, $\Delta\theta$ experienced by the satellite at a given longitude station is $$\Delta\theta=1.025\times 10^{-3} \sin 2(\lambda-\lambda_o)t^2 \text{(rad)}$$

where t=time in days.

In addition, nonzero orbit eccentricity will produce a diurnal oscillation in the satellite location with amplitude proportional to the magnitude of the eccentricity.

Figure 15:
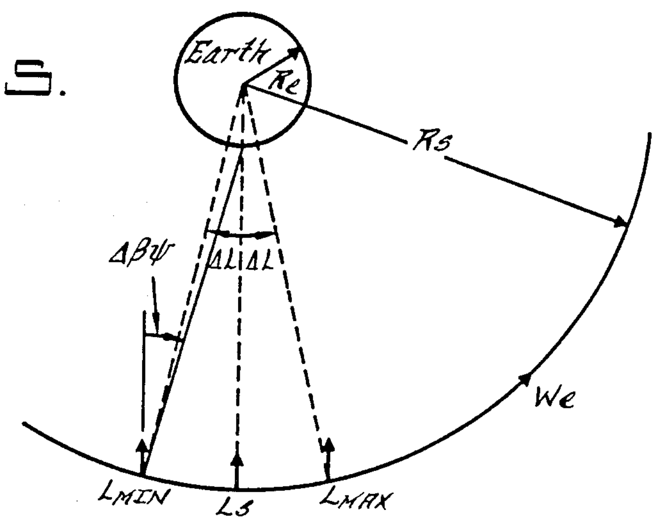
FIG. 15 is a diagram illustrating the orbit geometry for longitude drift and orbit eccentricity.
Figure 1E:
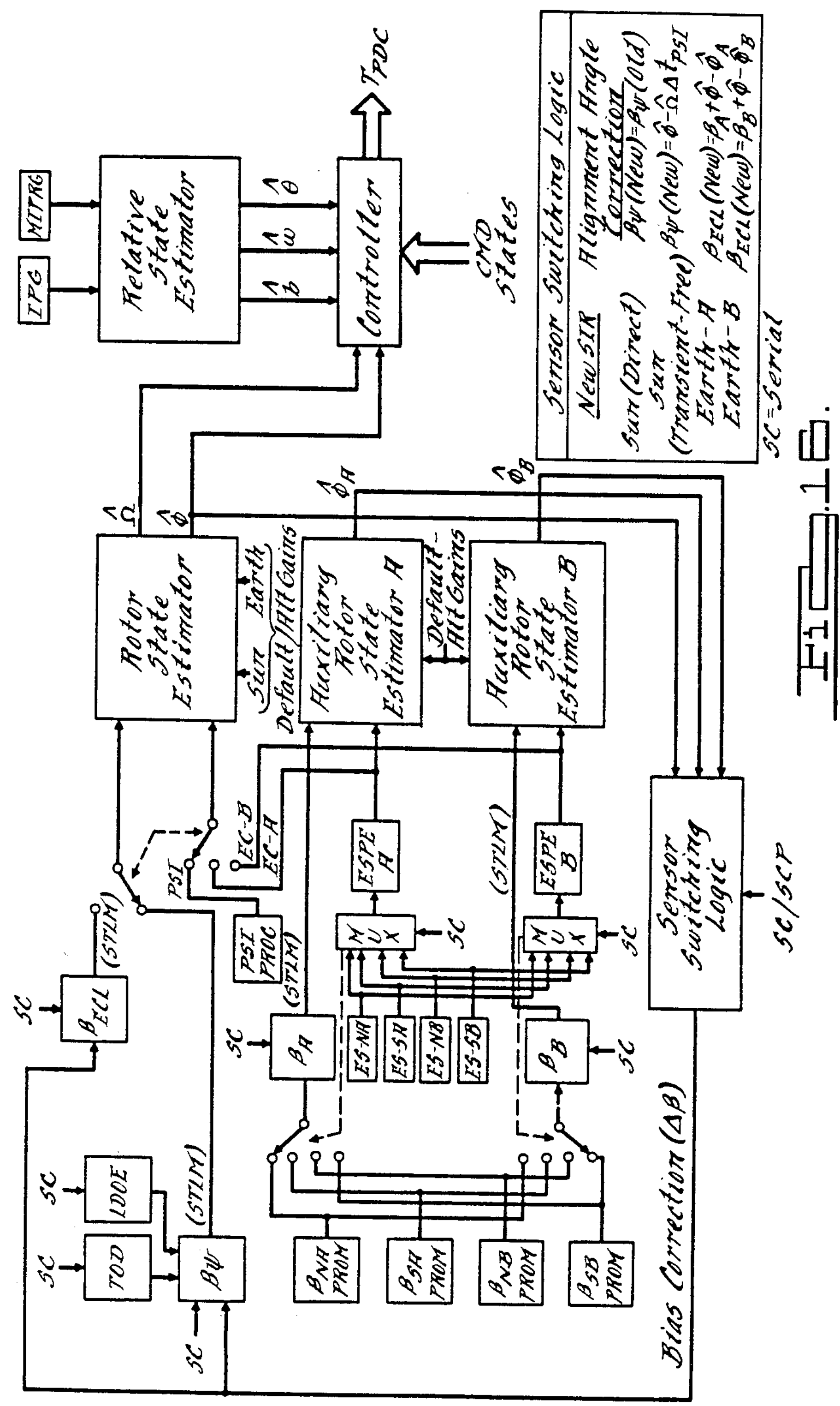

As illustrated in FIG. 15, the longitude as a function of time during a drift/eccentricity maneuver cycle is given by $$L(t)=L_o+D_ot+(\tfrac{1}{2})A_ot^2-2e(t) \sin(\omega_et+M(t))$$

where $L_o$=resultant mean longitude (degrees+W) at maneuver epoch $D_o$=resultant mean drift rate (degrees+W per solar day)

$A_o$=resultant mean acceleration (degrees+W per solar day squared)

e(t)=resultant mean eccentricity $\omega$=rotation rate (degrees per solar day) of earth m(T)=resultant mean anomaly (degrees)

As shown in FIG. 15, the platform pointing error relative to the nominal subsatellite point as a result of this longitude variation is given by $$P(t) = \tan^{-1}\left[\frac{Rs}{Rs-Re}(L(t)-L_s)\right] = \tan^{-1}[1.1782(L(t)-L_s)]$$

where $R_s$=synchronous orbit radius $R_e$=earth radius

An additional diurnal error of 0.016° will develop as a result of solar parallax. Solar parallax occurs because the semimajor axis of the satellite orbit is significant compared to the distance to the sun; i.e., a shift in the direction of the sun will develop as the spacecraft moves in its orbit. The amount of the shift is given by $$\Delta\theta \text{ (peak)} = \tan^{-1}\left[\frac{R_{sync}}{R_{earth-sun}}\right] = 0.016°$$

Where R sync is the radius of the spacecraft's synchronous orbit, and $R_{e-s}$ is the radius of the earth's orbit about the sun.

The LDOE algorithm, summarized below generates a firmware controlled time varying correction ($\Delta\beta_\psi$) to the internal sun sensor alignment angle ($\beta_\psi$) to maintain the correct instantaneous inertial azimuth angle between the sun light of sight and the earth centerline. The compensation algorithm is given by $$\Delta\beta_\psi(t) = -[D_c{}^*t_m + A_c{}^*t^2{}_m + (C_0 + C_1{}^*t_m)^* \cos(\omega_e{}^*t_m) + (S_0 + S_1{}^*t_m)^* \sin(\omega_e{}^*t_m)]$$

where commandable constants $D_c$=platform pointing error rate following east-west stationkeeping maneuver; $-1.178\times$satellite drift rate ($D_O$)

$A_c$=platform pointing error acceleration due to earth triaxial acceleration; $-1.178\times A_o/2$ $C_o, C_1, S_o, S_1$=coefficients for diurnal correction terms resulting from orbit eccentricity, solar parallax, and mean anomaly variations $\omega_e$=earth rotation rate (15 deg/hr) $t_m$=time (solar days) referenced to east-west station-keeping maneuver; $t_m$ is set to zero by command following each maneuver The correction to $\beta_\psi$ is computed every 10 minutes (the minimum increment of $t_m$ corresponding to 1/144 of a solar day). If the resulting change in the value of $\Delta\beta_\psi$ equals (or exceeds) 0.00549°, $\beta_\psi$ is incremented or decremented by 0.00549°. Only one correction is permitted during any 10 minute interval. Computer corrections greater than 0.01099° between any two consecutive intervals will automatically disable the LDOE indicating an error condition. Any coefficient may be modified by sending a new commanded value at any time without resetting the algorithm.

When the spacecraft nutates, nutational motion is kinematically coupled to rotor spin-axis motion. Kinematic coupling causes the inertial sensor pulse train to be phase modulated at inertial nutation frequency with magnitude proportional to the nutation angle. This effect is much more pronounced with the use of the sun sensor, rather than the earth sensor, as the inertial reference as the earth centerfinding error detection technique cancels out the nutational kinematic coupling signal. In sun mode the sinusoidal disturbance passes through the rotor state estimator and causes a sinusoidal torque to be superimposed on the despin motor torque. Kinematic coupling thus creates an additional feedback path through the spacecraft nutational dynamics. This path can be either stabilizing or destabilizing depending on the orientation of the spacecraft platform product of inertia with respect to the inertial reference (the sun). Thus, the nutational time constant due to kinematic coupling varies sinusoidally within a 24 hour period. If kinematic coupling is nutationally stabilizing at midnight, it will be destabilizing at noon. In addition, the strength of the kinematic coupling interaction is proportional to the sun elevation angle which causes kinematic coupling effect variations with a yearly period as well. Because of these variations, the PDC design has the kinematic coupling effect negated as much as possible by including a programmable sampled data notch filter 152 in the forward loop of the rotor state estimator.

The notch filter 152 is implemented as a difference equation sampled at the rate of occurrence of the inertial sensor (a 2 second sample period at 30 rpm).

The difference equation used to implement the notch filter has the form $$e_k = C_2(\epsilon_k + \epsilon_{k-2} - 2e_{k-2}) + C_1(\epsilon_{k-1} - e_{k-1}) + e_{k-2}$$

where $e_k$ is the $k^{th}$ filter output, $_k$ is the $k^{th}$ sensor residual error, and $C_1$ and $C_2$ specify the resonant frequency of the filter.

The difference equation above can be written as a transfer function in the Z-plane $$F(z) = \frac{e(z) = C_2 Z^2 + C_1 Z + C_2}{\epsilon(z)\ Z^2 + C_1 Z + (2\,C_2 - 1)}$$

The procedure used to design this filter, so that the notch occurs at nutation frequency, is to first design a continuous notch filter $$F(s) = \frac{S^2 + \omega_n^2}{S^2 + 2\xi\,\omega_n S + \omega_n}$$

The Z-transform equivalent of this filter is then found and $C_1$ and $C_2$ are derived from the spacecraft inertia ratio and above Z-transform.

There are three main noise sources which pass through the system and cause short term platform jitter: inertial sensor, index pulse, and BAPTA bearing friction torque noise. The inertial sensor broadband noise, due to pulse to pulse jitter, is much higher when using the earth sensor than when using the sun sensor. This signal is filtered by the RSE; thus, when using the earth sensor, a reduced bandwidth RSE is desired and is achieved by using much lower RSE gains. Index pulse jitter passes through and is attenuated by the inner loop compensator. The BAPTA torque noise is attenuated at low frequency if the inner loop compensator has a high gain (i.e., if the compensator pole at s=0 has a large residue). The pointing jitter due to all three noise sources is attenuated at high frequency by the plant, which essentially has a transfer function of $1/I_p{}^*s^2$.

The system, as designed, attenuates torque disturbance very strongly. This design permits a substantial increase in torque noise from that expected without significant pointing errors. The strong attenuation of torque noise implies a large low frequency compensator gain (large integrator gain) that also helps attenuate external disturbance torques.

The overall loop stability is primarily determined by the inner loop compensator design. The inner loop compensator must be shaped to give good overall stability margins (phase and gain margins) or, equivalently, well damped closed loop system poles. The RSE contributes considerable phase lag near its half-sample frequency. Therefore, it is necessary to design the inner loop compensator to have more stability margin than would otherwise be necessary.

In RRM and SSM the stability of the system is determined exclusively by the inner loop compensator as inertial sensor information is not used. Further, stability and nutation damping are the only considerations in the loop design in rate mode. However, the rate mode must operate over a wide range of spin speeds (10 rpm during superspin to 40 rpm on station) and with either one or two despin motors on. Thus, a low bandwidth state estimator must be chosen for stability at low spin speeds. Therefore, the gain is too low at nutation frequency for effective nutation damping in most configurations.

External rotor and platform torques are two main sources of error for the system during attitude and orbit maneuvers. When axial thrusters are fired, a torque is applied to the rotor due to thruster misalignment. When radial thrusters are fired, a torque is applied to the rotor due to thruster mismatch and misalignment. In either case, these torques cause the rotor to accelerate. The RSE has an internal model of a double integrator plant and, thus, has a nonzero steady state error ($\phi-\hat{\phi}$) due to acceleration. This error is inversely proportional to $K_\Omega$. Therefore, a high bandwidth RSE is needed to track the rotor phase during maneuvers. The pointing error is further attenuated by the feedforward of the thruster spin axis torque to the RSE and the RelSE. The rotor and relative phase estimates are more accurate because a large part of the rotor acceleration is known apriori.

In addition, during a radial thruster maneuver a large torque will be applied to the platform caused by the platform center of mass (CM) offset from the spin axis. To minimize this error the inner loop should have fast, well damped closed loop poles. This requirement is met by designing a high gain inner loop compensator to give the overall loop a high natural frequency and a large low frequency gain margin. The feedforward of the disturbance torque to the state estimators is helpful also because as momentum is added to the platform, it will eventually be transferred to the rotor. Thus, the feedforward allows the state estimates to reflect the disturbance sooner.

Referring now to FIG. 12B, the relative state estimator (RELSE) is shown to be a feedback compensator that is implemented as a discrete time state estimator-controller algorithm. It processes measurements of the relative rotor to platform phase to compute a despin motor torque command. The ReLSE uses measurements of the relative phase derived from the time of arrival of the index pulses to estimate the relative phase, rate, and BAPTA bias friction torque. In platform pointing mode these estimates are added to the motor phase and rate estimates from the rotor state estimator to derive estimates of the platform states (phase, rate, and bias torque). The platform states are subtracted from ground commanded platform states, and the differences are multiplied by control gains to derive control torques. In relative rate or superspin modes the estimate of the rotor to platform relative rate is subtracted from a commanded relative rate, and the difference is multiplied by a control gain to derive a control torque command. In either case, the control torques (phase, rate, and bias) are added together to derive the total despin motor torque command.

The ReLSE is a sampled data state estimator that corrects state estimates at every occurrence of an index pulse. However, the state estimates are propagated according to the plant model equations of motion at every real time interrupt occurring every 24 ms. Thus, the ReLSE uses essentially a discrete continuous state estimation algorithm.

At the first real time interrupt after the arrival of any given index pulse, the actual rotor to platform relative phase at the time of the pulse can be computed by using the alignment angle corresponding to the index pulse which occurred. The alignment angle of each index pulse is set by the processor and cannot be ground commanded.

An estimate of the relative phase at the index pulse TOA is generated by subtracting from the phase estimate at the following interrupt the estimated relative rate multiplied by the time interval between the pulse TOA and the interrupt. In other words, the relative phase estimate is propagated backwards in time from the interrupt to arrive at an estimate of the relative phase at the index pulse TOA. The estimated relative phase is subtracted from the measured relative phase to derive the index pulse measurement residual, $\epsilon_{IP}$. This residual is used to correct the estimates of the three relative states ($\theta_{rel}$, $\omega_{rel}$, b); the residual is multiplied by estimator gains and the products are added to the three state estimates. This procedure is followed at every occurrence of an index pulse; thus, the sample rate of the ReLSE is the index pulse rate, eight times the relative rate.

The relative state estimator has two sets of gains which may be independently specified to be default or alternate. The first set of gains controls the error feedback to the relative states: rate, phase, and bias torque. The second set of gains establish the controls torques generated by errors between commanded and estimated platform inertial rate and pointing angle.

The relative state estimator estimates three states of the relative rotor to platform rotational dynamics. The Laplace transform of the plant equation of motion is $$P(s) = \frac{I_P + I_s}{I_P I_s s^2}$$

Thus, the ReLSE has one more state than necessary to track the second order plant. The plant is, however, subject to unknown torque disturbances due to friction in the BAPTA bearing and motor back-EMF which have low frequency components as well as bias components slowly varying with time. It is possible to estimate this torque bias by observing the platform to rotor relative phase. The third state in the ReLSE is, therefore, an estimate of the net bias torque. The estimated bias torque is subtracted from the computed torque command to provide a net bias torque of zero when the BAPTA torque is added to the despin motor torque. At steady state this cancellation is perfect, and there is no steady state pointing error due to BAPTA friction. Including a bias torque estimate in the estimation algorithm causes the transfer function of the overall relative state estimator-controller to have a Z-plane pole at $Z=1$, or an s-plane pole at $s=0$. Thus, estimating the bias torque adds an integral term to the compensator.

The relative and rotor state estimates are combined to form inertial platform state estimates from which errors are generated to derive control torques. The equations used to accomplish this are $$\epsilon_{Pn} = \text{PSLEW} - \hat{\theta}_N - \hat{\phi}_n$$

and $$\epsilon_{Rn} = \text{CMDRAT} - \hat{\omega}_n - \hat{\Omega}_n$$

where PSLEW is a processor generated platform pointing angle command, based on the ground commanded platform pointing angle, and CMDRAT is the ground commanded platform rate.

The platform pointing angle can only be controlled with PPM commanded and a zero rate command. A zero pointing angle command will cause the platform to track directly the rotor inertial reference. The commanded angle will adjust the platform direction up to ±180° from this absolute zero reference.

When a new pointing angle is commanded, the value of PSLEW, against which the estimated platform angle is compared, is incremented or decremented from its current value by 0.00549° each real time interrupt until the commanded value is reached. The processor logic determines whether PSLEW should be incremented or decremented, based on which is the shorter distance to slew the platform from its current position to the commanded position.

The platform rate control calculation can be used to control both platform inertial and relative spin rates. Platform inertial rate control is achieved by commanding PPM and a nonzero rate command. When a nonzero commanded rate is entered, the torque component due to platform position is automatically zeroed, creating a rate only control loop. The platform inertial spin rate will be controlled to the commanded rate input since the relative and rotor state estimators generate true values of relative and rotor spin rates.

Relative rate control is achieved by internally forcing the rotor rate estimate to a constant value when commanding RRM or SSM (15 rpm for SSM, 30 rpm for RRM rate). This command automatically changes the controller to a relative rate control loop which will drive the relative rate to an absolute value equal to the commanded rate minus the fixed rotor rate estimate. In RPM the rotor spins faster than the platform but in the same direction. The relative rate is the difference between the two rates and is estimated by the relative state estimator as a negative value. For example, if RPM is commanded and the desired relative rate is 28 rpm (i.e., the rotor is spinning 28 rpm faster than the platform), the correct commanded rate to send would be $$CMDRAT = 30\ rpm - 28\ rpm = 2\ rpm$$

In SSM the platform spins faster than the rotor but again in the same direction. The relative rate is the difference between the two rates and is estimated by the relative state estimator to be a positive value. For example, if SSM is commanded and the desired relative rate is 12 rpm (i.e., the platform is spinning 12 rpm faster than the rotor), the correct commanded rate to send would be $$CMDRAT = 15\ rpm + 12\ rpm = 27\ rpm$$

As discussed above, there are two controller gains $C_p$ and $C_R$, in the despin algorithm. They are multiplied by the platform angle and rate errors, respectively, to form torque components which are used to calculate the despin motor torque. The individual torque components due to platform position error, platform rate error, and bias torque are preferably each limited and then added to form a limited sum. The limiting logic is designed to ensure that rate torque always dominates position torque which, in turn, dominates the bias torque. The torque command generated by the despin active nutation damper is also preferably limited and included in the limited sum if the DAND is enabled. The gains, $C_p$ and $C_R$, have a limited range of values to which they can be set by ground commands. One of the reasons that the ranges of $C_p$ and $C_R$ are limited is to make it more difficult for the ground controller to command a condition which would make the control system unstable.

The firmware within the PDC also provides for automatic, onboard transient-free switching between despin pointing control references. Platform boresight pointing errors following a reference switch are limited to small residual values that are within the overall attitude determination and control subsystem (ADCS) pointing error allocation. A ground command to change the selected inertial reference can be sent at any time. Receipt of the command automatically activates the sensor switching firmware. The stored command processor (SCP) can also be utilized to automatically initiate a reference change at a ground selected time.

As shown in FIGS. 13A–13E, PDC firmware processing includes three rotor state estimation algorithms, one of which is used for controlling the platform pointing direction (the RSE) and two auxiliary state estimators (ASEs) which have as their inputs the outputs of the two earth sensor processors (ESPE-A and ESPE-B). The ASEs continuously monitor the selected earth sensor and provide smoothed estimates (when the low bandwidth alternate estimation gains, $K_{\phi A}$ and $K_{\Omega A}$, are enabled) of rotor phase as derived from the earth sensors. Both estimators operate in an earth centerfinding mode.

FIG. 16 is a block diagram of the PDC showing the sensor switching logic elements, including the switching algorithm used in this logic. On orbit the primary reference switching logic will control transitions from sun to earth platform pointing control (pre-eclipse) and from earth to sun pointing (post-eclipse). The logic sequence is initiated by execution of the mode command by the SCP (at a ground programmed time) or by real time ground command. Receipt of the reference command establishes the new selected inertial reference (SIR) to be used by the RSE for pointing control. The sensor switching logic automatically corrects the RSE phase bias and selects the new sensor data to be used as input to the RSE. The transient-free switch algorithm is designed to force a zero estimator error condition at the first occurrence of the new SIR.

The logic sequence for switching from sun pointing reference to an earth sensor reference or between earth sensors is given in FIG. 16. When the sun to earth mode change is executed by the SCP, the difference between the two rotor phase estimates is computed; and this value is used to correct the earth mode alignment bias of the RSE ($\beta_{ECL}$). Thus, when control is transferred to the earth sensor reference, the rotor phase estimate (which establishes the inertial pointing direction for the platform) is unchanged from the desired (sun referenced) phase. This phase resetting technique compensates for the long term variations in the earth sensor pulse centerline caused by sensor temperature, rotor spin rate changes, processing electronics bias drift, and nonuniform earth radiance profiles. The dynamics of the auxiliary state estimators are selected to provide maximum filtering of earth sensor pulse-jitter, minimizing residual pointing biases caused by phase resetting on sensor noise.

Posteclipse return to sum referenced pointing is also controlled by the automatic logic sequence shown in FIG. 16. Upon execution of the sun reference mode command, data for the PDC rotor state estimator switches from the selected earth sensor to the sun sensor. Any residual pointing bias that may have developed during eclipse, while operating on the earth sensor, will result in a sensed estimation error when sun operation resumes (i.e., the earth centerline will have shifted from its initial, pre-eclipse reference value while the sun time of day and LDOE compensation have maintained the correct earth center pointing direction). The initial sun reference estimation error magnitude and direction exactly define the earth sensor (and, hence, platform pointing) bias shift. With the normal nulling of the estimation error by the state estimator dynamics, the platform boresight is returned to its normal true earth pointing direction. The residual error following the return to the sun pointing reference is determined by the accuracy of the time of day and LDOE correction functions.

The transient-free sun reference sensor switching command option is accomplished in a similar manner to that described, but will always maintain the current boresight pointing direction as the phase resetting reference. For the backup logic sequence, control transfer is carried out exactly the same as with the primary sun to earth switch logic (i.e., with correction of the sensor alignment angle $\beta_\psi$ to establish a constant initial reference). Transient-free switching to sun mode can be used during system test to hold a desired pointing direction or to properly initialize the sun alignment angle during on-orbit checkout.

Figure 17:
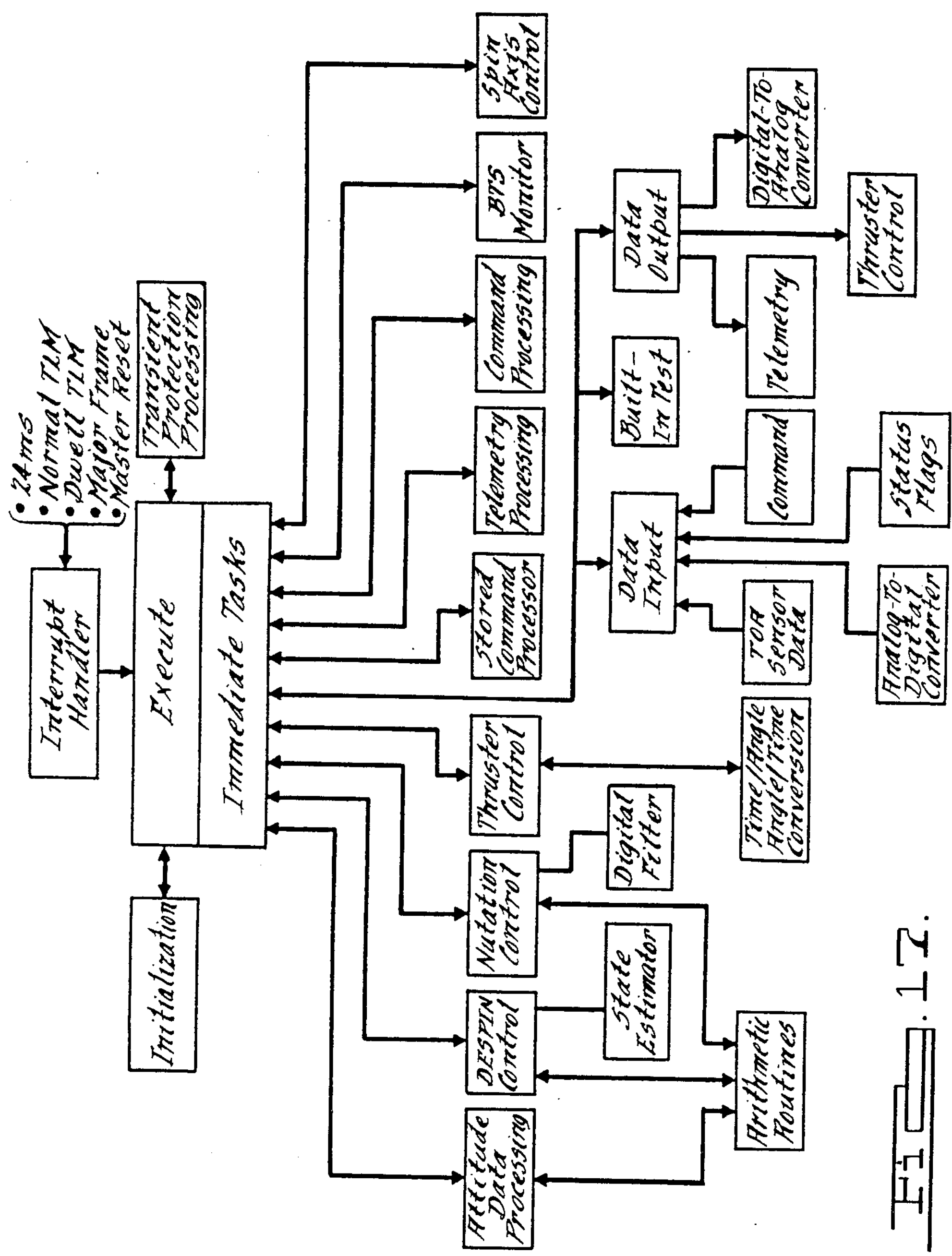
FIG. 17 is a block diagram of the attitude control processor firmware structure.

The hierarchical structure of the ACP firmware is shown in FIG. 17. This firmware is included in a microfiche appendix, which is hereby incorporated by reference. The firmware utilizes a three level top-down architecture. The executive top level controls and coordinates the firmware program execution. The function modules form the second level, with each function module responsible for a specific major task of the firmware. Subroutines form the bottom level. A subroutine may be dedicated to a particular module or common to all modules; in addition, subroutines may call other subroutines. The depth of nesting required is a maximum of three, although the size of the microsequencer stack permits a depth of five.

The executive module controls processing of the interrupts (master reset, telemetry, and real time clock (RTI) and execution of normal program sequencing. Telemetry (normal and/or dwell) requests are processed when they are received asynchronously with the program execution. At a telemetry interrupt, program execution is halted and the telemetry is serviced. The execution then returns to the normal sequence at the point of the interrupt.

Firmware execution is slaved to the hardware 24 ms RTI. Upon receipt of each RTI, the execution performs key time critical functions and then calls the functions in a linear time sequence. The major functions are processed at the module level, with most control functions coded as single modules. Large complex functions, such as torque and thruster control, are broken down into multiple modules.

Subroutines of the bottom level fall into two groups. The first group comprises general routines which are primarily math. The second group is the function specific routines. Subroutines may be called from the modules or from other subroutines. The maximum depth of nesting is three, except for the multiply routine.

The embodiment which has been set forth above was for the purpose of illustration and was not intended to limit the invention. It will be appreciated by those skilled in the art that various changes and modifications may be made to this embodiment described in this specification without departing from the spirit and scope of the invention as defined by the appended claims.

We claim:

1. A pointing apparatus for a dual-spin spacecraft having a spinning portion, a despun portion, and despin means for coupling said spinning and despun portions, said despin means having motor means for controlling the pointing direction of said despun portion, comprising:

first input means associated with said spinning portion for sensing an inertial attitude reference;

second input means for sensing a relative index reference between said spinning portion and said despun portion;

first digital processing means for estimating the inertial spin rate and phase of said spinning portion from said inertial attitude reference;

second digital processing means for estimating the relative spin rate and phase between said spinning portion and said despun portion from said relative index reference;

third digital processing means for providing estimates of the friction bias torque on said motor means from said relative index reference;

first summation means for adding said spinning portion spin rate and phase estimates with said relative spin rate and phase estimates to produce an estimate of said despun portion spin rate and phase;

command means external to said spacecraft for providing desired spin rate and phase states for said despun portion;

first subtraction means for subtracting said despun portion spin rate and phase estimates and said friction bias torque estimates from said desired spin rate and phase states for said despun portion; and control means for generating a torque command for controlling said motor means from said subtracted estimates.

2. The pointing apparatus according to claim 1, wherein said inertial attitude reference is the sun, and said first digital processing means includes filter means for removing kinematic coupling effects to said first input means due to nutational disturbances.

3. The pointing apparatus according to claim 2, wherein said first digital processing means includes bias correcting means for compensating for a constantly changing sun-earth angle.

4. The pointing apparatus according to claim 1, further including third input means associated with said spinning portion for sensing a second inertial attitude reference, auxiliary digital processing means for estimating the spin rate and phase of said second inertial attitude reference, and switching means for alternating between said first and second inertial attitude references by utilizing bias corrections provided by said auxiliary digital processing means.

5. The pointing apparatus according to claim 1, wherein said first and second input means include logic means for separately identifying and storing the time of arrival of said inertial attitude reference and said relative index reference.

6. The pointing apparatus according to claim 3, wherein said first digital processing means also includes alignment angle correcting means for compensating for longitude and residual orbit eccentricity of said spacecraft.

7. The pointing apparatus according to claim 1, wherein said first digital processing means includes feedforward means for compensating for pointing disturbances resulting from thruster firings.

8. A method of pointing a dual-spin spacecraft having a spinning portion, a despun portion, and despin means for coupling said spinning and despun portions, said despin means having motor means for controlling the pointing direction of said despun portion, comprising the steps of:

sensing said storing the time of arrival of an inertial attitude reference from said spinning portion;

sensing and storing the time of arrival of a relative index reference between said spinning portion and said despun portion;

estimating the inertial spin rate and phase of said spinning portion from said stored inertial attitude reference time of arrival;

estimating the relative spin rate and phase between said spinning portion and said despun portion from said stored relative index reference time of arrival;

providing the estimates of the friction bias torque on said despin means from said stored relative index reference time of arrival;

adding said spinning portion spin rate and phase estimates with said relative spin rate and phase estimates to produce an estimate of said despun portion spin rate and phase;

providing desired spin rate and phase states for said despun portion;

subtracting said despun portion spin rate and phase estimates and said friction bias torque estimates from said desired despun portion spin rate and phase states; and generating a torque command for controlling said motor means from said subtracted estimates.

* * * * *